(12) United States Patent
Minakawa et al.

(10) Patent No.: US 7,079,322 B2
(45) Date of Patent: Jul. 18, 2006

(54) WAVELENGTH DIVISION MULTIPLEXER

(75) Inventors: Yoshiaki Minakawa, Ibaraki (JP);
Tsuyoshi Maro, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 10/947,322

(22) Filed: Sep. 23, 2004

(65) Prior Publication Data

US 2005/0094282 A1 May 5, 2005

(30) Foreign Application Priority Data

Sep. 26, 2003 (JP) ............................. 2003-336056
Dec. 3, 2003 (JP) ............................. 2003-404071

(51) Int. Cl.
*G02B 27/14* (2006.01)
(52) U.S. Cl. ...................... 359/629; 359/634
(58) Field of Classification Search ................ 359/629, 359/634
See application file for complete search history.

(56) References Cited

U.S. PATENT DOCUMENTS 5,583,683 A * 12/1996 Scobey ........................ 398/79
2004/0109235 A1* 6/2004 Zhong et al. ................ 359/634

* cited by examiner

*Primary Examiner*—Hung Xuan Dong
*Assistant Examiner*—Joseph Martinez
(74) *Attorney, Agent, or Firm*—Birch, Stewart, Kolasch & Birch, LLP

(57) ABSTRACT

The wavelength division multiplexer includes a single optical substrate or a plurality of optical substrates integrated together, on which the first optical filter and the second optical filter are placed. The center wavelengths of three wavelength bands, $\lambda 1$, $\lambda 2$, and $\lambda 3$, satisfy: $0.92 \leq \lambda 2/\lambda 1 \leq 1.08$, and $0.20 \leq \lambda 3/\lambda 1 \leq 0.92$ or $1.08 \leq \lambda 3/\lambda 1 \leq 5.00$. The first optical filter combines or separates light of $\lambda 3$ and two-wavelength multiplexed light of $\lambda 1$ and $\lambda 2$. The second optical filter combines or separates light of $\lambda 1$ and light of $\lambda 2$.

8 Claims, 15 Drawing Sheets

WAVELENGTH DIVISION MULTIPLEXER

CROSS-REFERENCE TO RELATED APPLICATION

This Nonprovisional application claims priority under 35 U.S.C. § 119(a) on Patent Application Nos. 2003-336056 and 2003-404071 filed in Japan on Sep. 26, 2003 and Dec. 3, 2003, respectively, the entire contents of which are hereby incorporated by reference.

BACKGROUND OF THE INVENTION

1. Field of the Invention

The present invention relates to a wavelength division multiplexer.

2. Description of Related Art

A dielectric multilayer film is in wide use as an antireflection film coated on an eyeglass lens, a color separation filter for TV coated on a glass substrate, and so on. For example, the dielectric multilayer film is used for a color separation filter used in a liquid crystal projector, camera, and so on. It is also used for a laser detection mirror in a digital versatile disk (DVD) device and so on. When use for the laser detection mirror, the dielectric multilayer film is placed between two glass prism substrates so that light is incident on the dielectric multilayer film at a certain angle.

In the field of communications, wavelength division multiplexing (WDM) optical communication technology has been introduced. This technique needs a filter where a dielectric multilayer film which serves as an edge filter or a bandpass filter is deposited on a glass substrate in order to separate light with different wavelengths.

In the optical communication, it is possible to combine or separate light with a plurality of wavelength bands by connecting 3-terminal modules in cascade. It is, however, necessary to use a plurality of 3-terminal modules of at least one less than the number of wavelength bands, which requires high equipment costs, a large area, and high installation costs.

Japanese Unexamined Patent Application Publication No. 08-082711 and Yoichi Fujii, "Opto-electronics", Agne Shofu Publishing, Inc., Tokyo, 1993, p. 169 introduce a technique that incorporates a plurality of bandpass filters and edge filters into one module to combine and separate a plurality of wavelengths. However, since a split angle of light is small, incorporation of a transmitting laser and a receiving diode requires a long optical path, which results in a large equipment size and high installation costs.

On the other hand, to reduce the equipment size, it is necessary to use a laser diode array, resulting in cost increase. In order to reduce the equipment size without increasing costs, it is necessary to increase the split angle of light. This, however, causes large divergence between P-wave and S-wave of outgoing light, deteriorating division multiplexer characteristics. The characteristics thus deteriorate if the P-polarized and S-polarized light enter at a large split angle, which is, at a large incident angle. The amplitude/wavelength characteristics of outgoing light thereby greatly diverge due to the polarization direction of the incoming light.

A technique to overcome this problem is proposed in Japanese Unexamined Patent Application Publication No. 2000-162413. This technique uses Si for a high refractive index layer of a dielectric multilayer filter, and $TiO_2$, $SiO_2$ for a low refractive index layer of the filter. However, when the filter is placed under high temperature and humidity conditions of 85° C.85% RH, oxygen of $TiO_2$ and $SiO_2$ of the low refractive index layer spreads to the high refractive index layer side. This causes the refractive index of Si and Ge layer to decrease and that of the low refractive index layer to increase. This results in wavelength shift and optical characteristics variation. Further, since ZnS and ZnSe, which are generally used for the high refractive index layer, show low adhesion to $SiO_2$ and $TiO_2$, ZnS and ZnSe are easy to separate from SiO2 and TiO2.

If incident medium is air with refractive index 1, the characteristics variation due to a difference in polarization direction can be reduced. However, recent optical components are packaged in high density for miniaturization, and the filter is usually directly bonded to other optical parts such as fiber capillary, prism, lens, and waveguide. In this case, in order to have air as the incident medium, it is necessary to form an air-sandwich structure. To form the air-sandwich structure, an antireflection layer is formed on a bonded surface so as to suppress the amplitude variation due to multiple reflection. Since the antireflection layer is optimized for air with refractive index 1, the transmission characteristics decreases if a resin and the like used for bonding comes to a light transmitting surface. It is therefore necessary to make a structure that prevents the resin from coming to the surface, resulting in cost increase.

SUMMARY OF THE INVENTION

In view of the foregoing, an object of the present invention is to prevent characteristic deterioration depending on a polarization surface when combining or separating light having more than two wavelengths with one optical component, and provide a multilayer filter and an optical component for wavelength division multiplexing which achieve good wavelength division multiplexing characteristics with a small size, allow flexible selection of bonding material used for bonding a plurality of substrates, and have good retaining characteristics while transmitting light.

Another object of the present invention is to prevent characteristic deterioration depending on a polarization surface when combining or separating light having more than two wavelength bands with one optical component, and provide a multilayer filter and an optical component for wavelength division multiplexing which achieves good wavelength division multiplexing characteristics with a small size.

To these ends, according to one aspect of the present invention, there is provided a wavelength division multiplexer for combining and/or separating wavelength multiplexed light comprising at least three wavelength bands, including a single optical substrate or a plurality of optical substrates integrated together and at least two optical filters, a first optical filter and a second optical filter, having different characteristics, placed on the optical substrate or substrates. In this wavelength division multiplexer, the center wavelengths of three wavelength bands, $\lambda 1$, $\lambda 2$, and $\lambda 3$, satisfy: $0.92 \leq \lambda 2/\lambda 1 \leq 1.08$, and $0.20 \leq \lambda 3/\lambda 1 \leq 0.92$ or $1.08 \leq \lambda 3/\lambda 1 \leq 5.00$. The first optical filter is placed in a light path of three-wavelength multiplexed light comprising three wavelength bands with the center wavelengths of $\lambda 1$, $\lambda 2$, and $\lambda 3$ to combine or separate light comprising a wavelength band with the center wavelength of $\lambda 3$ and two-wavelength multiplexed light comprising two wavelength bands with the center wavelengths of $\lambda 1$ and $\lambda 2$. The second optical filter is placed in a light path of the two-wavelength multiplexed light to combine or separate light comprising a wavelength band with the center wavelength of $\lambda 1$ and light comprising a wavelength band with the center wavelength of λ2. In this configuration, it is possible to solve the problem that the amplitude/wavelength characteristics of outgoing light diverge due to a polarization surface of incoming light, S-wave, and P-wave.

In another aspect, it is preferred that the first optical filter reflects the light of λ3 and transmits the two-wavelength multiplexed light of λ1 and λ2, of the three-wavelength multiplexed light, and the second optical filter reflects the light of λ2 and transmits the light of λ1, of the two-wavelength multiplexed light. A refractive index $n_A$ of incident medium of the first optical filter, and an angle $\theta_A$ between the three-wavelength multiplexed light incident on the first optical filter and a normal to a surface of the first optical filter preferably satisfy: $\theta_A \geq 15°$ and $n_A*\text{Sin } \theta_A \leq 0.95$, and a refractive index $n_B$ of incident medium of the second optical filter, an angle $\theta_B$ between the two-wavelength multiplexed light incident on the second optical filter and a normal to a surface of the second optical filter preferably satisfy: $\theta_B \geq 15°$ and $n_B*\text{Sin } \theta_B \leq 0.85$.

Further, in the above aspect, an angle α between the first optical filter and the second optical filter preferably satisfies $60° \leq \alpha \leq 120°$.

In still another aspect, it is preferred that the first optical filter transmits the light of λ3 and reflects the two-wavelength multiplexed light of λ1 and λ2, of the three-wavelength multiplexed light, and the second optical filter transmits the light of λ2 and reflects the light of λ1, of the two-wavelength multiplexed light. A refractive index $n_A$ of incident medium of the first optical filter, and an angle $\theta_A$ between the three-wavelength multiplexed light incident on the first optical filter and a normal to a surface of the first optical filter preferably satisfy: $\theta_A \geq 5°$ and $n_A*\text{Sin } \theta_A \leq 0.95$, and a refractive index $n_B$ of incident medium of the second optical filter, an angle $\theta_B$ between the two-wavelength multiplexed light incident on the second optical filter and a normal to a surface of the second optical filter preferably satisfy: $\theta_B \geq 5°$ and $n_B*\text{Sin } \theta_B \leq 0.85$.

Further, in the above aspect, an angle α between the first optical filter and the second optical filter preferably satisfies: $\alpha \leq \theta_A+5$ and $10° \leq \alpha \leq 90°$.

According to yet another aspect of the present invention, there is provided a wavelength division multiplexer for combining and/or separating wavelength multiplexed light comprising at least three wavelength bands, including a single optical substrate or a plurality of optical substrates integrated together, and at least two optical filters, a first optical filter and a second optical filter, having different characteristics, placed on the optical substrate or substrates. In this wavelength division multiplexer, the center wavelengths of three wavelength bands, λ1, λ2, and λ3, satisfy: $0.94 \leq \lambda2/\lambda1 \leq 0.98$, and $0.20 \leq \lambda3/\lambda1 \leq 0.94$. The first optical filter is placed in a light path of three-wavelength multiplexed light comprising three wavelength bands with the center wavelengths of λ1, λ2, and λ3 to combine or separate light comprising a wavelength band with the center wavelength of λ1 and two-wavelength multiplexed light comprising two wavelength bands with the center wavelengths of λ2 and λ3. The second optical filter is placed in a light path of the two-wavelength multiplexed light to combine or separate light comprising a wavelength band with the center wavelength of λ2 and light comprising a wavelength band with the center wavelength of λ3. In this configuration, it is possible to solve the problem that the amplitude/wavelength characteristics of outgoing light diverge due to a polarization surface of incoming light, S-wave, and P-wave.

In another aspect, it is preferred that the first optical filter reflects the light of λ1 and transmits the two-wavelength multiplexed light of λ2 and λ3, of the three-wavelength multiplexed light, the second optical filter reflects the light of λ2 and transmits the light of λ3, of the two-wavelength multiplexed light, and an angle $\theta_A$ between the three-wavelength multiplexed light incident on the first optical filter and a normal to a surface of the first optical filter satisfies: $5° \leq \theta_A \leq 30°$.

In the above aspect, the wavelength division multiplexer preferably further includes a mirror placed in a light path of the light of λ1 reflected from the first optical filter, and a refractive index $n_M$ of incident medium of the mirror, and an angle $\theta_M$ between the light of λ1 reflected from the first optical filter and a normal to a surface of the mirror preferably satisfy: $n_M*\text{Sin } \theta_M \geq 1$ and $\theta_B \leq 85°$.

Preferably, the first optical filter is an edge filter, and the second optical filter is a bandpass filter or an edge filter.

The present invention allows providing a small-size and low-cost wavelength division multiplexer with good characteristics for combining or separating at least three-wavelength multiplexed light into three wavelength band light.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

Preferred embodiments of the present invention are explained hereinafter with reference to the drawings. The present invention is applicable to a wavelength division multiplexer for combining and/or separating three different wavelengths. In other words, the present invention is applicable to a wavelength division multiplexer for combining and/or separating light with different wavelength bands which do not overlap with each other. In the following description, light of $\lambda 1$, $\lambda 2$, and $\lambda 3$ means light with a wavelength band having the center wavelength of $\lambda 1$, $\lambda 2$, and $\lambda 3$, respectively, unless otherwise noted.

Embodiment 1

Figure 1:
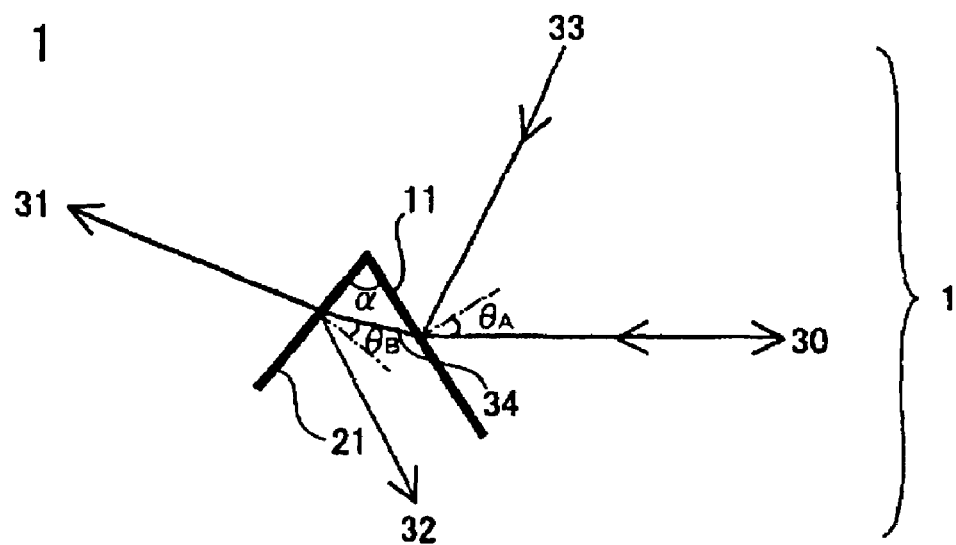
FIG. 1 is a diagram showing a wavelength division multiplexer of a first embodiment of the invention.

FIG. 1 is a schematic diagram illustrating an embodiment of a wavelength division multiplexer for separating wavelength multiplexed light consisting of at least three wavelength bands or combining wavelength bands into wavelength multiplexed light. In FIG. 1, an optical substrate and the like are omitted to schematically illustrate the wavelength division multiplexer.

As shown in FIG. 1, a wavelength division multiplexer 1 is composed of a first filter A 11 and a second filter B 21. The first filter A 11 and the second filter B 21 are supported by a single optical substrate or a plurality of optical substrates integrated together as described later, though not shown in this figure. Thus, the first filter A 11 and the second filter B 21 are configured to function as one optical element in a whole, thereby achieving miniaturization.

The light of $\lambda 3$ moves from the direction indicated by a reference numeral 33. It is then reflected by the first filter A 11 in the direction 30. The light of $\lambda 1$ and $\lambda 2$, on the other hand, moves from the direction 30 toward the first filter A 11. The light of $\lambda 3$ is combined with the two-wavelength multiplexed light consisting of the light of $\lambda 1$ and $\lambda 2$ at the first filter A 11, where three-wavelength multiplexed light is thereby created.

The relationship of the center wavelengths of the three-wavelength multiplexed light of this invention satisfies $0.92 \leq \lambda 2/\lambda 1 \leq 1.08$, and $0.205 \leq \lambda 3/\lambda 1 \leq 0.92$ or $1.08 \leq \lambda 3/\lambda 1 \leq 5.00$. The light of $\lambda 1$ and $\lambda 2$ never overlap, thus $\lambda 1 \neq \lambda 2$.

Generally, an optical bandpass filter, not an optical edge filter, is preferred for use to separate two wavelength bands which are so close as to satisfy $0.92 \leq \lambda 2/\lambda 1 \leq 1.08$. This allows making a sharp edge in a transition width between transmission and reflection. However, if the light of $\lambda 3$ with the wavelength band so apart from those of the light of $\lambda 1$ and $\lambda 2$ as to satisfy $0.20 \leq \lambda 3/\lambda 1 \leq 0.92$ or $1.08 \leq \lambda 3/\lambda 1 \leq 5.00$ is incident on such an optical bandpass filter, it is difficult to obtain high transmittance and reflectance, causing unstable characteristics.

An optical edge filter, on the other hand, is suitable for use to separate the light with two wavelength bands apart from each other, and it is possible to obtain a very wide pass band. However, the optical edge filter is not suitable for use to separate two wavelength bands close to each other since it requires a large number of layers, which complicates the manufacture.

The inventors of the present invention found that it is possible to achieve a low-cost and high-performance wavelength division multiplexer by employing the following structure.

In FIG. 1, the light of $\lambda 3$ comes from the direction 33 and enters the first filter A 11. The two multiplexed wavelength light of $\lambda 1$ and $\lambda 2$ come from the direction 30 and enters the first filter A 11. Thus, the first filter A 11 is placed on a light path of the wavelength multiplexed light consisting of three wavelength bands.

The first filter A 11 is an edge filter for combining the light of $\lambda 3$ into the light of $\lambda 1$ and $\lambda 2$ or separating the light of $\lambda 3$ from the light of $\lambda 1$ and $\lambda 2$. Thus, if the first filter A 11 has the characteristics to reflect the wavelength $\lambda 3$, the light of $\lambda 3$ is reflected on the first filter A 11 in the direction 30, from which the wavelengths $\lambda 1$ and $\lambda 2$ come.

On the other hand, if the first filter A 11 has the characteristics to transmit the wavelengths $\lambda 1$ and $\lambda 2$, the two-wavelength multiplexed light of $\lambda 1$ and $\lambda 2$ passes through the first filter A 11. The first filter A 11 thereby separates the wavelength $\lambda 3$ which is apart from the other two wavelengths $\lambda 1$ and $\lambda 2$ of the three multiplexed wavelength light.

The two-wavelength multiplexed light 34 of $\lambda 1$ and $\lambda 2$ which have passed through the first filter A 11 then enters the second filter B 21 placed on its light path. The second filter B 21 is a bandpass filter capable of combining or separating the wavelengths $\lambda 1$ and $\lambda 2$. For example, the second filter B 21 has the characteristics to transmit the wavelength λ1 and reflect the wavelength λ2. Thus, the two-wavelength multiplexed light 34 is separated into the wavelengths λ1 and λ2. The wavelength λ1 moves in the direction 31 and λ2 in the direction 32.

If an incident angle $\theta_A$ of the three-wavelength multiplexed light on the first filter A 11 is smaller than 15 degrees, the angular difference between the three-wavelength multiplexed light and the transmission light of λ3 is too small. Optical elements for these light thereby come too close, making it difficult to arrange the optical elements. It is therefore preferred that the angle $\theta_A$ is 15 degrees or larger. On the other hand, as the incident angle $\theta_A$ on the first filter A 11 increases, the reflectance of an edge filter constituting the first filter A 11 for P-polarized light decreases. To obtain sufficient reflectance for P-polarized light, the angle $\theta_A$ should be such a value that satisfies $n_A * \sin \theta_A \leq 0.95$, where $n_A$ is a refraction index of the substrate A.

Thus, a lower refraction index $n_A$ allows more flexible design of the angle $\theta_A$, and if the angle $\theta_A$ is the same, a lower $n_A$ allows higher reflectance for P-polarized light. Hence, the refraction index $n_A$ is preferably low. The incident angle $\theta_A$ is preferably 20 degrees or larger, and the value of $n_A * \sin \theta_A$ is preferably 0.8 or smaller.

If an incident angle $\theta_B$ of the two-wavelength multiplexed light on the second filter B 21 is smaller than 15 degrees, the angular difference between the two-wavelength multiplexed light and the light of λ2 is so small that the arrangement of optical elements is difficult. It is therefore preferred that the angle $\theta_B$ is 15 degrees or larger. On the other hand, if the incident angle $\theta_B$ on the second filter B 21 increases, the characteristics of the bandpass filter constituting the second filter B 21 decreases.

To obtain stable characteristics of the bandpass filter in the pass band, the angle $\theta_B$ should be such a value that satisfies $n_B * \sin \theta_B \leq 0.85$, where $n_B$ is a refraction index of incident medium of the second filter B 21. The value of $n_B * \sin \theta_B$ should be 0.85 or less in order also to obtain sufficient reflectance for the P-polarized light.

Thus, a lower refraction index $n_a$ of incident medium of the second filter B 21 allows more flexible design of the angle $\theta_B$. The lower $n_B$ also allows more stable characteristics in the pass band of the second filter B 21, and higher reflectance in the reflection bandwidth for the P-polarized light. Hence, the refraction index $n_B$ is preferably low. The incident angle $\theta_B$ is preferably 20 degrees or larger, and the value of $n_B * \sin \theta_B$ is preferably 0.7 or smaller.

If the exit medium of the first filter A 11 and the incident medium of the second filter B 21 are both air, an angle α for obtaining the incident angle $\theta_B$ is given by the following equation:

$$\alpha = \theta_B + \arcsin(n_A * \sin \theta_A) \tag{1}$$

Hence, if the refraction index $n_A$ of the substrate A and the incident angle $\theta_A$ on the first filter A 11 are predetermined, it is possible to calculate the angle α between the first filter A 11 and the second filter B 21 for obtaining a desired angle $\theta_B$. An effective range of the angle α is $60° \leq \alpha \leq 120°$, and preferably $70° \leq \alpha \leq 100°$.

Embodiment 2

Figure 2:
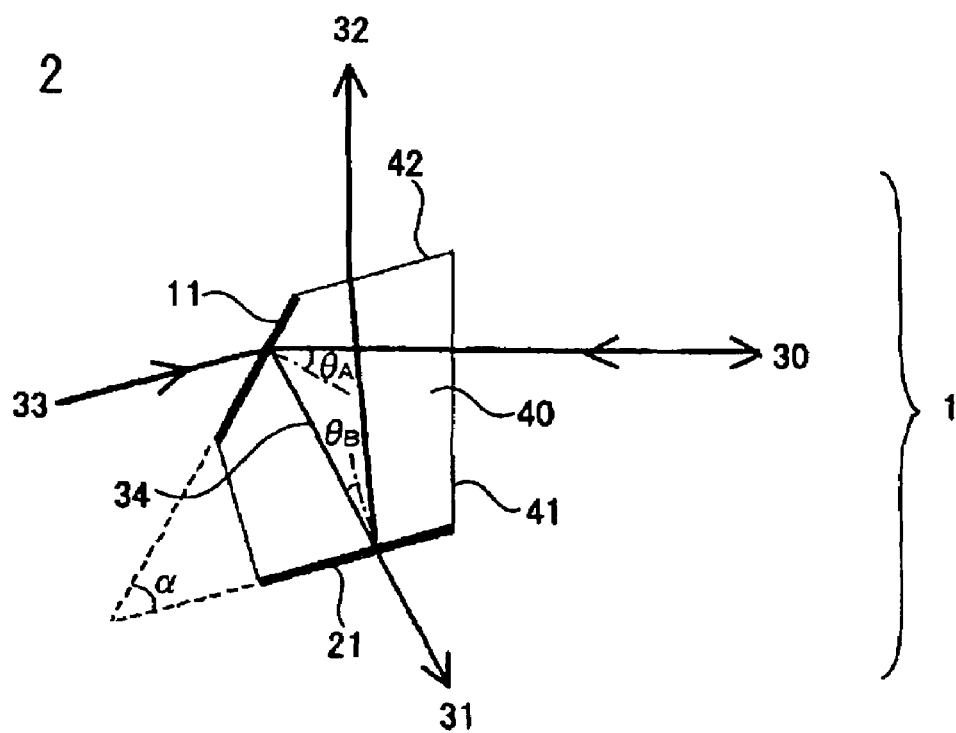
FIG. 2 is a diagram showing a wavelength division multiplexer of a second embodiment of the invention.

FIG. 2 is a schematic diagram illustrating another embodiment of a wavelength division multiplexer according to the present invention. The wavelength division multiplexer 1 shown in FIG. 2 is composed of the first filter A 11 and the second filter B 21 placed on different surfaces of a single substrate C 40. The single substrate may be replaced by a plurality of optical substrates integrated together.

As shown in FIG. 2, the light of λ3 coming from the direction 33 passes through the first filter A 11 and is combined with the light of λ1 and λ2 coming through the substrate, creating three-wavelength multiplexed light. On the other hand, two-wavelength multiplexed light of λ1 and λ2 is reflected by the first filter A 11 and enters the second filter B 21, where the two-wavelength multiplexed light is separated into the light of λ1 and the light of λ2.

A short wave pass filter is used for the first filter A 11, and an optical bandpass filter is used for the second filter B 21.

Though the filter surfaces of the first filter A 11 and the second filter B 21 do not directly cross each other in FIG. 2, it is possible to extend the surfaces as shown by dotted lines so that they cross each other at an angle α.

The three-wavelength multiplexed light enters or exits the substrate C 40 through a light incident and exit surface C 41. The light incident and exit surface C 41 is placed perpendicular to the three-wavelength multiplexed light. It may be inclined at an angle of 1 to 10 degrees.

The three-wavelength multiplexed light enters or exits the wavelength division multiplexer 1 through the light incident and exit surface C 41. One way to let the light enter or exit the multiplexer 1 is to transform the three-wavelength multiplexed light transmitted through an optical fiber and so on into parallel light with a collimator lens and the like and then guide it to the first filter A 11. Another way is to fix a ferrule of an optical fiber to the light incident and exit surface C 41 by bonding or melt bonding and then guide diffused light having a divergence angle determined by NA of the optical fiber to the first filter A 11.

The three-wavelength multiplexed light, which is incoming and outgoing light, enters or exits the first filter A 11 at an angle $\theta_A$ with respect to the normal to the filter surface. The wavelengths λ1 and λ2 of the three-wavelength multiplexed light are reflected by the substrate side surface of the first filter A 11 at the angle $\theta_A$, transmitted through the substrate, and incident on the second filter B 21. Even if the light of λ3 from another light source coming from the same direction as the light of λ1 and λ2 gets mixed in with the three-wavelength multiplexed light, it passes through the first filter A 11 and exits in the direction 33, thus causing no significant problem.

The light of λ3 passes through the first filter A 11 and is combined with the light of λ1 and λ2, becoming the three-wavelength multiplexed light.

If the angle $\theta_A$ is smaller than 5 degrees, the angle between the three-wavelength multiplexed light and the two-wavelength multiplexed light of λ1 and λ2 is too small. The second filter B 21 and the light path of three-wavelength multiplexed light thereby come very close, which makes it difficult to position the second filter B 21. For this reason, the angle $\theta_A$ is preferably 5 degrees or larger.

On the other hand, if the incident angle $\theta_A$ on the first filer A 11 increases, the reflectance of the edge filter constituting the first filter A 11 for the P-polarized light decreases.

To obtain sufficient reflectance for the P-polarized light, the angle $\theta_A$ should be such a value that satisfies $n_A * \sin \theta_A \leq 0.95$, where $n_A$ is a refraction index of the substrate A. Thus, a refraction index $n_A$ allows more flexible design of the angle $\theta_A$, and if the angle $\theta_A$ is the same, the lower $n_A$ allows higher reflectance for the P-polarized light. The refraction index $n_A$ is thus preferably low. The incident angle $\theta_A$ is preferably 10 degrees or larger, and the value of $n_A * \sin \theta_A$ is preferably 0.8 or smaller.

The transmission light of λ3 is refracted as it passes through the first filter A 11 to enter the substrate C 40. It is necessary to consider this refraction angle when determining the incident angle of the transmission light on the substrate surface. Thus, variation in the refractive index $n_c$ of the substrate C 40 is preferably small.

The two-wavelength multiplexed light of λ1 and λ2, on the other hand, is reflected by the first filter A 11 and enters the second filter B 21 at an angle $\theta_B$ with respect to the normal to the filter surface. The second filter B 21 is an optical bandpass filter which transmits either one of the wavelengths λ1 and λ2 and reflects the other one, thereby combining or separating the two-wavelength multiplexed light.

If the angle $\theta_B$ is smaller than 5 degrees, the angular difference between the light of λ2 reflected from the second filter B 21 and the two-wavelength multiplexed light is so small that the light of λ2 undesirably enters the first filter A 11. It is therefore preferred that the angle $\theta_B$ is 5 degrees or larger.

On the other hand, if the incident angle $\theta_B$ on the second filter B 21 increases, the characteristics of the bandpass filter constituting the second filter B 21 deteriorates. To obtain stable characteristics of the bandpass filter in the pass band, it is necessary that the angle $\theta_B$ be such a value that satisfies $n_B * \sin \theta_B \leq 0.85$, where $n_B$ is a refraction index of incident medium of the second filter B 21. The value of $n_B * \sin \theta_B$ should be 0.85 or less in order also to obtain sufficient reflectance for the P-polarized light.

Thus, the lower refraction index $n_B$ of incident medium of the second filter B 21 allows more flexible design of the angle $\theta_B$, more stable characteristics in the pass band of the second filter B 21, and higher reflectance in the reflection bandwidth for the P-polarized light. Hence, the refraction index $n_B$ is preferably low. The incident angle $\theta_B$ is preferably 10 degrees or larger, and the value of $n_B * \sin \theta_B$ is preferably 0.7 or smaller.

If the incident medium of the first filter A 11 and the incident medium of the second filter B 21 are the same, an angle α for obtaining the incident angle $\theta_B$ is given by the following equation:

$$\alpha = \theta_A + \theta_B \quad (2)$$

Thus, if the incident angle $\theta_A$ on the first filter A 11 is predetermined, it is possible to calculate the angle α between the first filter A 11 and the second filter B 21 for obtaining a desired angle $\theta_B$. An effective range of the angle α is $20° \leq \alpha \leq 90°$, preferably $30° \leq \alpha \leq 75°$, and more preferably $35° \leq \alpha \leq 60°$.

The refraction angle of the light of λ1 can be controlled by inclining the exit surface C 42 of the substrate C 40 with respect to the filter B 21. Adjusting the angle of the exit surface C 42 allows adjusting the exit angle of the light of λ1. In FIG. 2, the exit surface C 42 is placed parallel to the surface of the second filter B 21.

The refractive index $n_C$ of the substrate C 40 affects the exit angle of the light of λ2. If the refractive index $n_C$ varies widely, the exit angle of the light of λ2 also varies widely. The substrate C 40 is therefore preferably formed by material with small variation in the refractive index. Further, in the case of not applying anti reflection (AR) coating to the exit surface C 42, the refractive index $n_C$ of the substrate C 40 is preferably low in order to suppress the reflection on the exit surface C 42.

Embodiment 3

Figure 3:
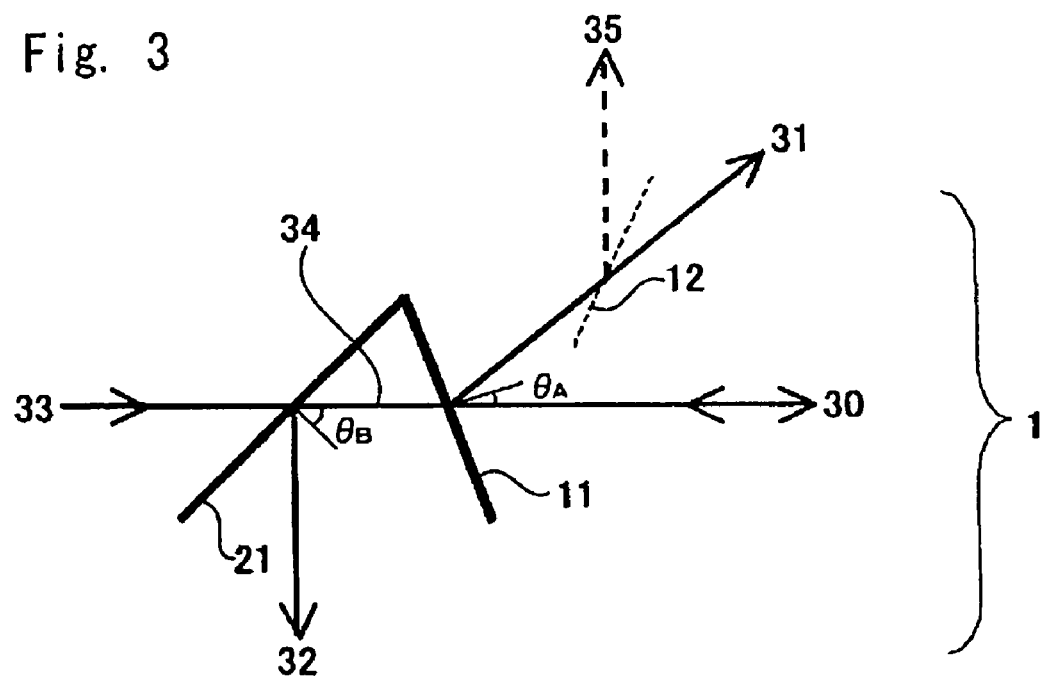
FIG. 3 is a diagram showing a wavelength division multiplexer of a third embodiment of the invention.

FIG. 3 is a schematic diagram illustrating yet another embodiment of a wavelength division multiplexer according to the present invention. The first filter A 11 combines or separates the light 31 of λ1 and the two-wavelength multiplexed light 34 of λ2 and λ3 into or from three-wavelength multiplexed light. The second filter B 21 combines or separates the light 32 of λ2 and the light 33 of λ3 into or from two-wavelength multiplexed light 34.

The relationship of the center wavelengths of the three-wavelength multiplexed light of this invention satisfies $0.94 \leq \lambda 2/\lambda 1 \leq 0.98$ and $0.20 \leq \lambda 3/\lambda 1 \leq 0.94$. This is because the present invention uses an edge filter to combine or separate wavelength multiplexed light, and it is difficult for the edge filter to separate the wavelength bands closer than the above range.

In the structure shown in FIG. 3 where the first filter A 11 combines or separates one wavelength band into or from three-wavelength multiplexed light, it is preferred that the angle $\theta_A$ between the normal to the first filter A 11 and the three-wavelength multiplexed light is 45 degrees. This allows a reflected light to be perpendicular to the three-wavelength multiplexed light, which facilitates arrangement of optical elements.

However, in the case of separating two wavelength bands as close as $0.94 \leq \lambda 2/\lambda 1 \leq 0.98$, use of a normal optical edge filter at an incident angle of 45 degrees causes large divergence in the characteristics of S-polarized and P-polarized light. The optical characteristics of the wavelength division multiplexer 1 thereby vary widely depending on the polarization state of light. An approach to avoid this problem is to design a special optical edge filter which allows no significant divergence in the characteristics of S-polarized and P-polarized light.

Such a filter, however, generally causes lower reflectance in a reflection area. One way to obtain sufficient reflectance is to use a special film material so that the high refractive index layer of the filter is 3 or higher. Another way is to use an edge filter having 100 or more laminated layers. Either technique, however, significantly increases manufacturing costs.

Further, even if the reflectance is improved by the above techniques, setting the angle $\theta_A$ to 45 degrees still causes the problem that only one degree change in the incident angle due to manufacturing variation leads to large deviation in transition wavelength in the edge filter. Hence, the edge filter is not suitable for use in separating the two wavelengths as close as $0.94 \leq \lambda 2/\lambda 1 \leq 0.98$ since little deviation of the incident angle from a predetermined value results in significant characteristics change.

To overcome this problem, it is necessary to set the angle $\theta_A$ to 30 degrees or smaller. If the angle $\theta_A$ is larger than 30 degrees, the characteristics of S-polarized and P-polarized light greatly diverge at the first filter A 11. Further, little deviation of the incident angle causes large deviation at the edge in the wavelength direction, deteriorating optical characteristics.

On the other hand, if the angle $\theta_A$ is 30 degrees or smaller, the angle between the three-wavelength multiplexed light 30 and the light 31 reflected from the first filter A 11 is too small. This makes it difficult to position an optical element for receiving the light 31 of λ1. Further, if the angle $\theta_A$ is too small, the angular difference between the three-wavelength multiplexed light 30 and the light 31 reflected from the first filter A 11 becomes very small. This causes the light to move toward the bonded surface of the substrates A and C, not the mirror 12 in the structure shown in FIG. 26. The angle $\theta_A$ is thus preferably 5 degrees or larger.

A structure to achieve a low-cost and high-performance wavelength division multiplexer is such that the angle $\theta_A$ is 5 to 30 degrees, preferably 10 to 25 degrees, and a mirror 12 is placed in the light path of the light 31 of $\lambda 1$ reflected from the first filter A 11. This structure allows a reflected light 35 from the mirror 12 to be at a large angle with respect to the three-wavelength multiplexed light, achieving the low-cost and high-performance wavelength division multiplexer.

As shown in FIG. 3, the three-wavelength multiplexed light enters or exits the first filter A 11 at the angle $\theta_A$ with respect to the normal to the filter surface. The light of $\lambda 1$ and $\lambda 2$ of the three-wavelength multiplexed light come from the direction 30 and enter the first filter A 11 at the angle $\theta_A$ with respect to the normal to the filter surface. The first filter A 11 reflects the light of $\lambda 1$ in the direction 31. The reflected light of $\lambda 1$ is then reflected by the mirror 12 and moves in the direction 35. The light of $\lambda 1$ is thereby at almost right angle with respect to the three-wavelength multiplexed light 30, which further facilitates the design of member.

The light of $\lambda 2$ passes through the first filter A 11 and enters the second filter B 21, where it is reflected in the direction 32. The light of $\lambda 3$, on the other hand, comes from the direction 33 and enters the second filter B 21. The light of $\lambda 3$ then passes through the second filter B 21 and the first filter A 11 and moves the direction 30.

The light of $\lambda 3$ which has passed through the second filter B 21 is combined with the light of $\lambda 2$; thus, the two-wavelength multiplexed light 34 is created at the second filter B 21. The two-wavelength multiplexed light 34 then passes through the first filter A 11 and is combined with the light of $\lambda 1$; thus, the three-wavelength multiplexed light 30 is created at the first filter A 11. Even if the light having the wavelength $\lambda 3$ from another light source coming from the same direction as the light of $\lambda 1$ and $\lambda 2$ gets mixed in with the three-wavelength multiplexed light, it passes through the first filter A 11 and the second filter B 21 to exit in the direction 33, thus causing no significant problem.

In this embodiment, it is possible to predetermine the incident angle of the light of $\lambda 1$ on the mirror 12 so that the mirror 12 serves as a total reflection mirror by polishing the surface of the mirror 12 to be flat. This eliminates the need for forming a high reflectance film, allowing reduction of manufacturing costs. In this case, it is preferred to satisfy the relationship $n_M * \sin \theta_M \geq 1$, where the refractive index of the incident medium on the mirror 12 is $n_M$, the angle between the light of $\lambda 1$ reflected from the first filter A 11 and the normal to the mirror surface is $\theta_M$.

The larger the angle $\theta_M$ is, the smaller the angle between the light of $\lambda 1$ reflected from the first filter A 11 and the mirror 12 is. This causes only little deviation in the incident position of the three-wavelength multiplexed light 30 in the manufacturing process to cause wide variation in the incident of the light 31 of $\lambda 1$ on the mirror 12. For easier manufacture of the wavelength division multiplexer 1, it is preferred that the angle $\theta_M$ is 85 degrees or smaller. Preferably, the value of $n_M * \sin \theta_M$ is 1.1 or larger, and the angle $\theta_M$ is 75 degrees or smaller.

In this invention, the direction of incoming and outgoing light may be opposite. In this case, the combined light and the separated light described above become separated light and combined light, respectively. Further though the light of $\lambda 3$ and the light of $\lambda 1$ and $\lambda 2$ enter the first filter A 11 of the wavelength division multiplexer 1 from different directions, they may come from the same direction as three-wavelength multiplexed light.

The filter used in this invention is composed of a high-refractive index film and a low-refractive index film laminated on a substrate. The high-refractive index film is made of at least one material selected from oxides such as Ta oxide, Ti oxide, Ce oxide, Hf oxide, Zr oxide, Nb oxide, Y oxide, Cr oxide, nitrides such as Si nitride, Ge nitride, carbides such as Si carbide, semiconductors such as ZnS, ZnSe, GaP, InP, GaAs, GaAl, GaN, and a mixture of these.

On the other hand, the low-refractive index film is made of at least one material selected from oxides such as Si oxide, Al oxide, Mg oxide, Ge oxide, fluorides such as Ca fluoride, Ba fluoride, Ce fluoride, Mg fluoride, Na fluoride, Nd fluoride, $Na_5Al_3F_{14}$, $Na_3AlF_6$, and a mixture of these.

Though it is preferred to use the same type of material for each film, the film may be partly made of a different material having similar refractive index. In order to improve preservation characteristics under high-temperature and high-humidity conditions, it is preferred to use oxides, nitrides, carbides, or fluorides.

The optical filers of the present invention are an example of a dielectric multilayer filter, and they may be produced by a vacuum deposition method, for example. There are various techniques for the vacuum deposition method, including vacuum evaporation, sputtering, chemical vapor deposition, and laser ablation. When employing the vacuum evaporation technique, it is effective to use ion plating deposition which ionizes part of vapor flow and applies a bias voltage to a substrate to improve the film characteristics, ionized cluster beam deposition, and ion assisted deposition which applies ion beam to a substrate with an ion gun.

The sputtering technique includes DC reactive sputtering, RF sputtering, ion beam sputtering, and so on. The chemical vapor deposition technique includes plasma polymerization, light assisted deposition, thermal decomposition, metal organic chemical vapor deposition, and so on. A desired film thickness can be obtained by adjusting the deposition time and so on in the film formation process.

Further, the substrate may be formed of any material as long as it is transparent, including optical glass and crystallized glass such as quartz glass and boroquartzte glass, semiconductor substrates such as Si wafer, GaAs wafer, GaIn wafer, and SiC wafer, oxide single crystal and polycrystalline substrates such as $LiNbO_3$, $LiTaO_3$, $TiO_2$, $SrTiO_3$, $Al_2O_3$, and MgO, fluoride single crystal and polycrystalline substrates such as $CaF_2$, $MgF_2$, $BaF_2$, LiG, chloride and bromide single crystal and polycrystalline substrates such as NaCl, KBr, and KCl, and plastics such as acryl, amorphous polyolefin, and polycarbonate.

Examples of the present invention are described hereinafter with reference to the drawings, though this invention is not restricted to these examples. The filters used in the examples are formed of Si oxide with the refractive index of 1.46 and Nb oxide with the refractive index of 2.21. The substrate is formed of quartz glass with the refractive index of 1.44. The refractive index of air is 1.00.

The wavelength bands used for the wavelength division multiplexer 1 in the examples below are as follows.

TABLE 1

| | Wavelength range (nm) | Center wavelength (nm) | Signal direction |
| --- | --- | --- | --- |
| $\lambda 1$ | 1540–1560 | 1550 | Received |
| $\lambda 2$ | 1480–1500 | 1490 | Received |
| $\lambda 3$ | 1260–1360 | 1310 | Transmitted |

The wavelength band of $\lambda 1$ uses the light with the wavelength range of 1540 to 1560 nm and the center wavelength of 1550 nm for reception. The wavelength band of $\lambda 2$ uses the light with the wavelength range of 1480 to 1500 nm and the center wavelength of 1490 nm for reception. The wavelength band of λ3 uses the light with the wavelength range of 1260 to 1360 nm and the center wavelength of 1310 nm for transmission. The center wavelengths of the wavelength bands have the relationship of λ2/λ1=0.96 and λ3/λ1=0.85.

EXAMPLE 1

The wavelength division multiplexer, which uses the three wavelength bands shown in Table 1, needs to have a structure suitable for the wavelength bands λ1 and λ2 close to each other and the wavelength band λ3 apart from these.

Figure 4:
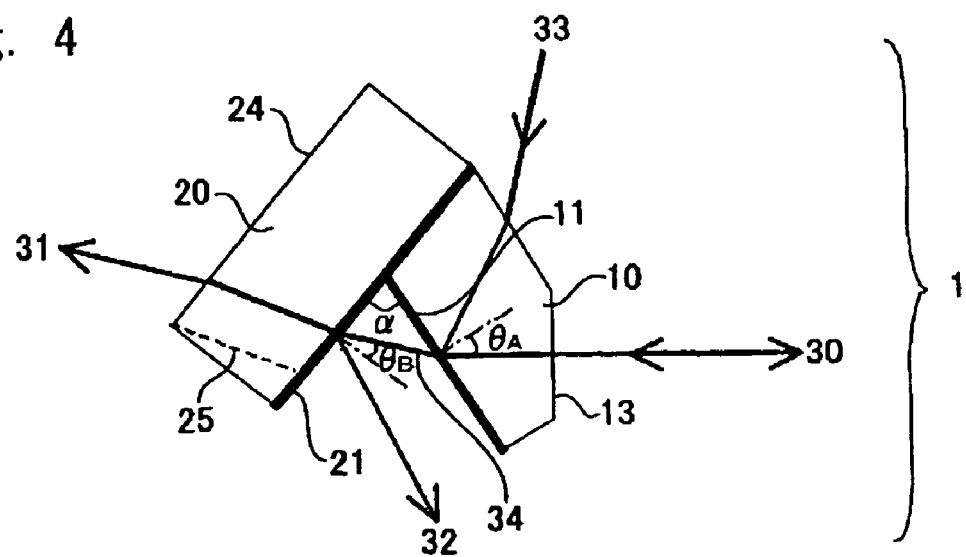
FIG. 4 is a diagram showing a wavelength division multiplexer of a first example.

FIG. 4 is a schematic diagram illustrating an example of the wavelength division multiplexer 1 according to this invention. The wavelength division multiplexer 1 is composed of two optical substrates A 10 and B 20 fixed to each other in a V-shape at an angle α by bonding and so on.

Specifically, the first filter A 11 is placed on the surface of the substrate A 10 constituting the inner surface of the V-portion, and the second filter B 21 is placed on the surface of the substrate B 20 constituting the inner surface of the V-portion. The substrates A 10 and B 20 are bonded to each other so that the two optical substrates are integrated together.

The light of 3 reflected from the first filter A 11 is combined with the light of λ1 and λ2, creating three-wavelength multiplexed light. The two-wavelength multiplexed light consisting of the wavelength bands of λ1 and λ2 passes through the first filter A 11 and then enters the second filter B 21, where it is separated into the light of λ1 and the light of λ2.

The first filter A 11 is a long wave pass filter, and the second filter B 21 is an optical bandpass filter.

Though the second filter B 21 is placed also on the bonded surface of the substrates A 10 and B 20 in FIG. 4, it is not necessarily to placed there. The first filter A 11 and the second filter B 21 are formed on the substrate by the vacuum deposition method.

As shown in FIG. 4, the two optical filters having different characteristics are placed on the two optical substrates bonded together in this example, thereby achieving the miniaturization of the wavelength division multiplexer. Further, since the bonded surface of the substrates does not interfere with the light path, it allows more flexible selection of bonding material and reduces deterioration of optical characteristics due to degradation of the bonding material, increasing the preservation characteristics.

The substrate A 10 has a cut surface A 13 for easier incidence of the three-wavelength multiplexed light, though it is not necessarily formed. The cut surface A 13, it formed, may be at a right angle or within 1 to 10 degrees from the right angle with respect to the three-wavelength multiplexed light. The three-wavelength multiplexed light, which is light transmitted from or received by the wavelength division multiplexer 1, enters or exits the first filter A 11 through the cut surface A 13.

One way to let the light to enter or exit the first filter A 11 is to transform the three-wavelength multiplexed light transmitted through an optical fiber and so on into parallel light with a collimator lens and the like and then guide it to the first filter A 11. Another way is to fix a ferrule of an optical fiber to the cut surface A 13 by bonding or melt bonding and then guide diffused light having a divergence angle determined by NA of the optical fiber to the first filter A 11.

The three-wavelength multiplexed light, which is input/output signal light, enters the first filter A 11 at an angle of $\theta_A$ with respect to the normal to the filter surface. The wavelengths 1550 nm and 1490 nm of the three-wavelength multiplexed light pass through the first filter A 11 and enter the second filter B 21. Even if the light with the center wavelength of 1310 nm from another light source gets mixed in with the three-wavelength multiplexed light, it is reflected at the angle $\theta_A$ and exits the substrate A 10.

The light with the center wavelength of 1310 nm used for transmission is designed to pass through the optical substrate A 10, enter the first filter A 11 at the angle $\theta_A$, is reflected from it at the same angle, and then coupled into the optical fiver through which the three-wavelength multiplexed light is transmitted.

In this example, the optical substrate is quartz glass and the angle $\theta_A$ is 30 degrees, thus satisfying the relationship $n_A * \sin \theta_A = 0.72$. It is preferred to let the P-polarization of the transmission light with 1310 nm to the substrate in order to reduce reflection on the substrate surface and reduce transmission loss.

On the other hand, the two-wavelength multiplexed light of 1550 nm and 1490 nm after passing through the first filter A 11 enters the second filter B 21 at an angle $\theta_B$ with respect to the normal to the filter surface. The second filter B 21 may be an optical bandpass filter which transmits either one of the wavelengths 1550 nm and 1490 nm and reflects the other one, thereby separating the two-wavelength multiplexed light. In this example, the bandpass filter is designed to transmit the light of 1550 nm and reflect the light of 1490 nm.

If the exit medium of the first filter A 11 and the incident medium of the second filter B 21 are both air as in this example, the angle α for obtaining the incident angle $\theta_B$ is given by the above equation (1).

Since $\theta_A$ is 30 degrees and $n_A$ is 1.44 in this example, the angle α is 76.1 degrees for obtaining the angle $\theta_B$ of 30 degrees. The value of $n_B * \sin \theta_B$ is 0.5.

Though the exit medium of the first filter A 11 and the incident medium of the second filter B 21 are both air in this example, it is also possible to place an optical element such as another optical substrate on the exit surface of the second filter B 21. This allows the exit medium of the first filter A 11 and the incident medium of the second filter B 21 to be different. In this case, the angle $\theta_B$ may be changed according to the refractive index and shape of the optical element placed on the exit surface.

The light of λ1 entering the second filter B 21 can be reflected at several percents by the back surface B 24 in the direction of the light of λ2. If the light of λ1 gets mixed with the light receiving element for the λ2 light, crosstalk can occur. The crosstalk can be avoided by applying AR coating to the back surface B 24 or cutting the surface of the substrate B to have a rough surface B 25 so as to scatter the light reflected from the back surface B 24.

The refractive index of the substrate B 20 affects the exit angle of the light of λ1 with the center wavelength of 1550 nm. If the refractive index of the substrate B 20 varies widely, the exit angle of the light of λ1 also varies widely. Thus, the substrate B 20 is preferably formed of material with small variation in the refractive index. Since the value of the refractive index of the substrate B 20 does not affect the characteristics of the first filter A 11 and the second filer B 21, there is no specific restriction on this value. However, if AR coating is not applied to the back surface B 24, the refractive index of the substrate B 10 is preferably low in order to suppress the reflection on the back surface B 24.

Figure 5:
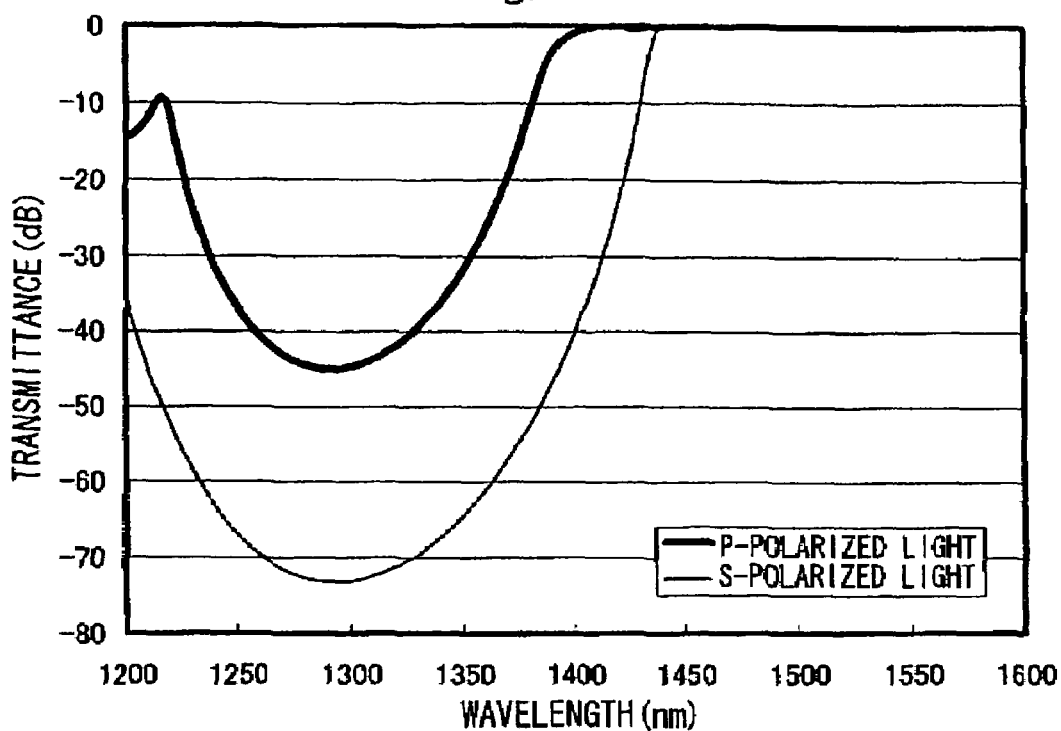
FIG. 5 is a graph showing the characteristics of an optical edge filter, which is a first filter A of the first example.

FIG. 5 shows the characteristics of a long wave pass filter used as the first filter A 11 in this example. The incident medium is quartz glass with the refractive index of 1.44, the incident angle θ_A is 30 degrees, and the exit medium is air. The high refractive index material is Nb oxide with the refractive index of 2.21, and the low refractive index material is Si oxide with the refractive index of 1.46.

Figure 6:
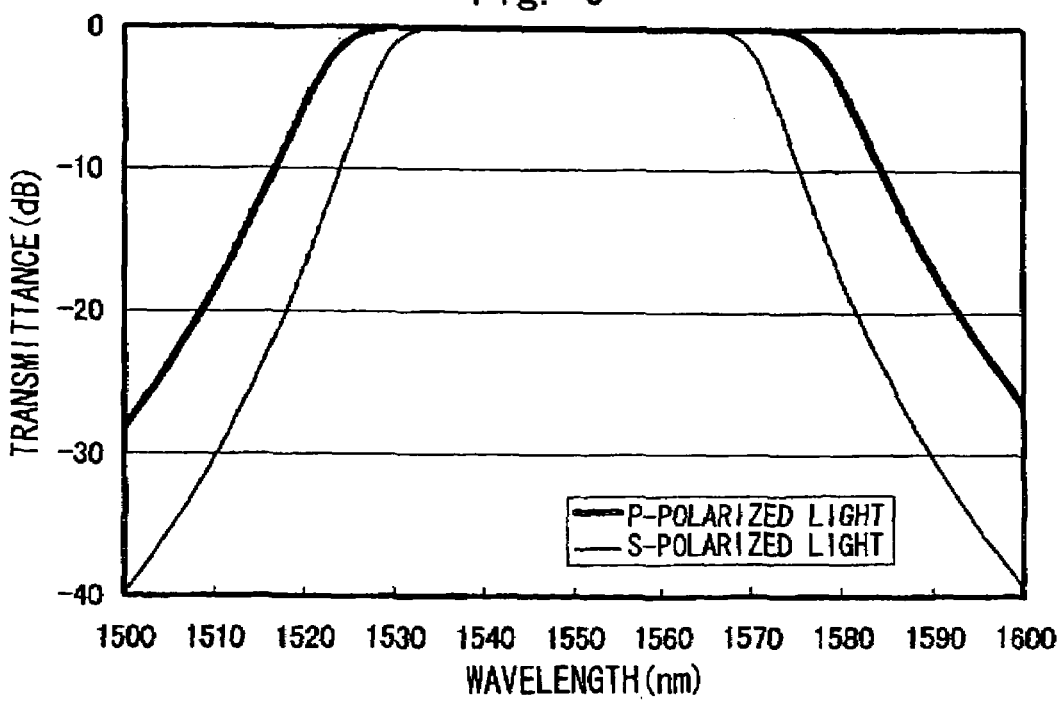
FIG. 6 is a graph showing the characteristics of an optical bandpass filter, which is a second filter B of the first example.

FIG. 6 shows the characteristics of an optical bandpass filter used as the second filter B 21 in this example. The incident medium is air, the incident angle θ_B is 30 degrees, and the exit medium is quartz glass with the refractive index of 1.44. The high refractive index material is Nb oxide with the refractive index of 2.21 and the low refractive index material is Si oxide with the refractive index of 1.46.

Figure 7:
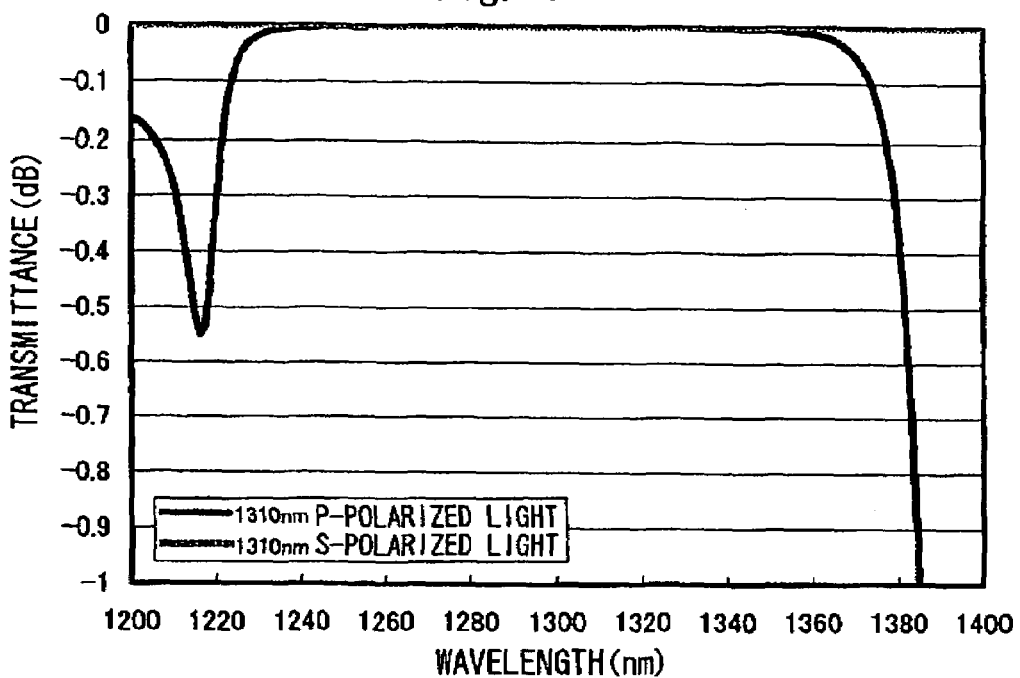
FIG. 7 is a graph showing the characteristics of a transmitting signal of the wavelength division multiplexer of the first example.

FIG. 7 shows the characteristics of a transmitting signal with the center wavelength of 1310 nm in the wavelength division multiplexer of this example. In the use range of 1260 to 1360 nm, transmission loss is low both for the P-polarized and S-polarized light, thus having suitable multiplexing characteristics.

Figure 8:
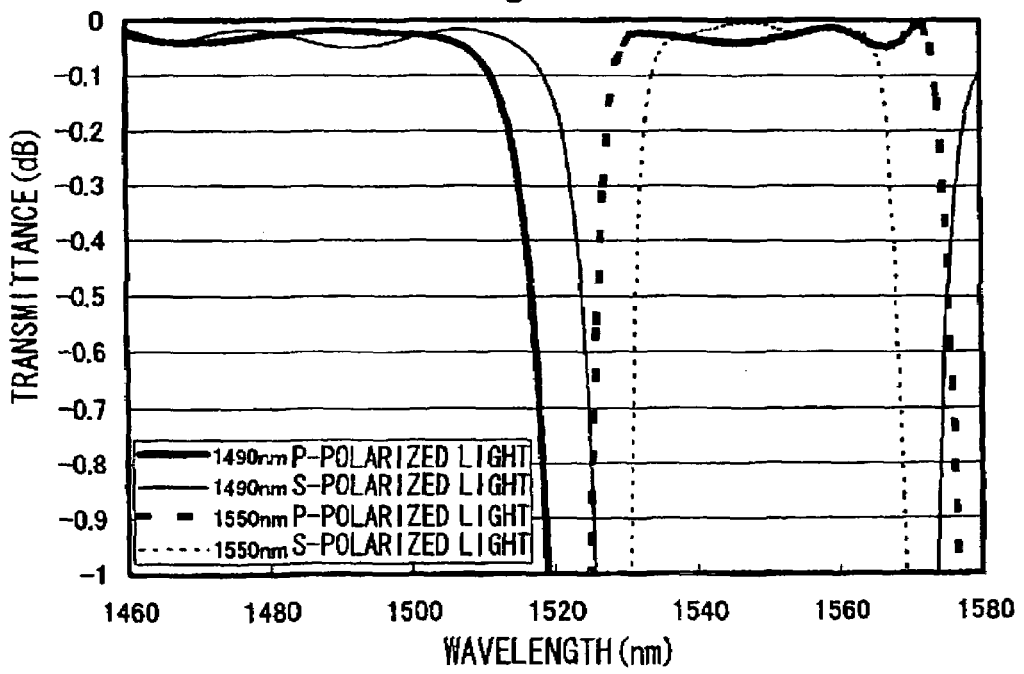
FIG. 8 is a graph showing the characteristics of a receiving signal of the wavelength division multiplexer of the first example.

FIG. 8 shows the characteristics of a receiving signal with the wavelength bands of 1490 nm and 1550 nm in the wavelength division multiplexer of this example. In the use range of 1480 to 1500 nm for the 1490 nm light, and 1540 to 1560 nm for the 1550 nm light, transmission loss is low both for the P-polarized and S-polarized light, thus having suitable dividing characteristics.

EXAMPLE 2

Figure 9:
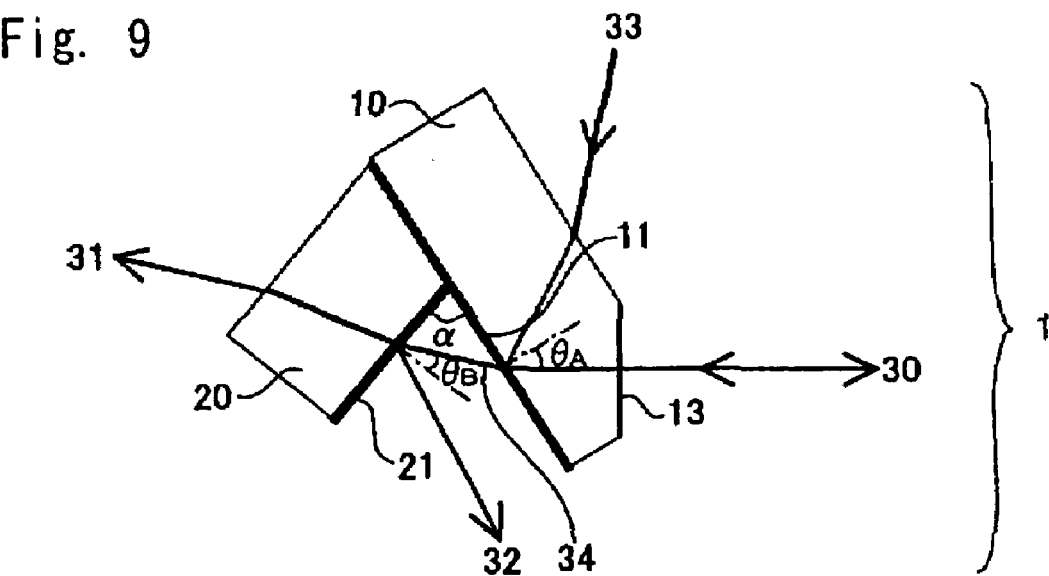
FIG. 9 is diagram showing a wavelength division multiplexer of a second example.

FIG. 9 is a schematic diagram illustrating another example of the wavelength division multiplexer of this invention.

This wavelength division multiplexer is optically the same as the one shown in FIG. 4, except that the arrangement of two substrates making a V-shape is different. Thus, the substrates A and B are both formed of quartz glass with the refractive index of 1.44, the angle θ_A is 30 degrees, θ_B is 30 degrees, the value of $n_A * \sin θ_A$ is 0.72, $n_B * \sin θ_B$ is 0.5, and the angle α is 76.1 degrees. The same optical characteristics as in the first example can be obtained in this example.

EXAMPLE 3

Figure 10:
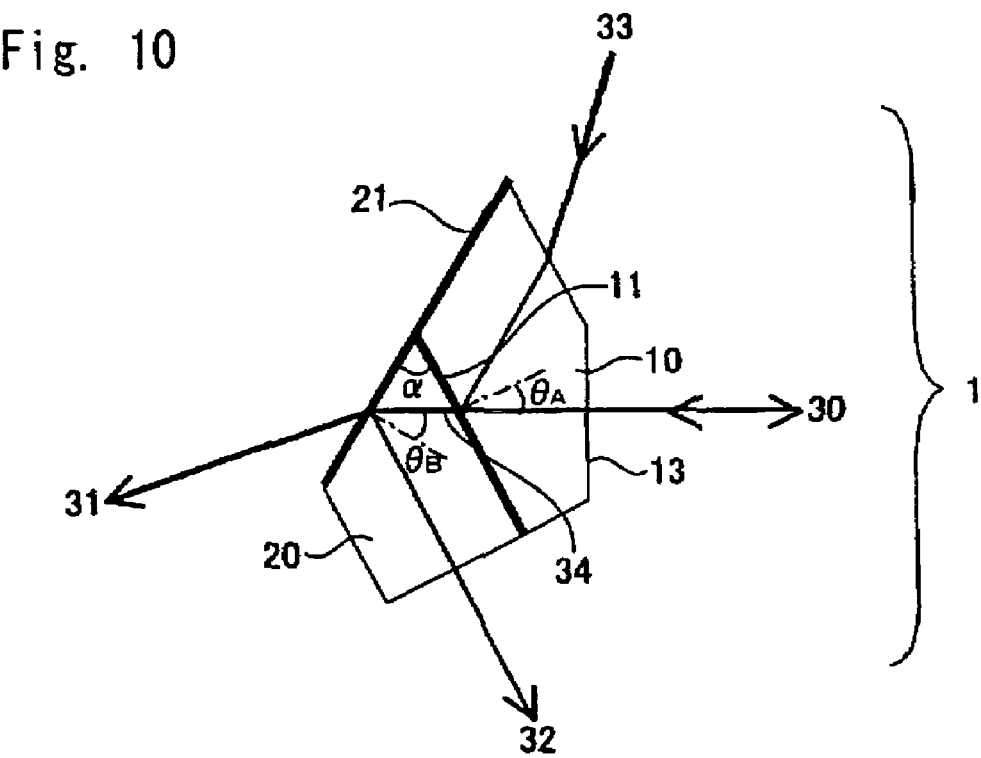
FIG. 10 is diagram showing a wavelength division multiplexer of a third example.

FIG. 10 is a schematic diagram illustrating another example of the wavelength division multiplexer of this invention.

The substrate A 10 is formed of quartz glass and the incident angle on the first filter A 11 is 30 degrees. The substrate B 20 is also formed of quartz glass and the incident angle on the second filter B 21 is 30 degrees. Thus, the value of $n_A * \sin θ_A$ is 0.72, $n_B * \sin θ_B$ is 0.72, and the angle α between the first filter A 11 and th second filter B 21 is 60 degrees.

Figure 11:
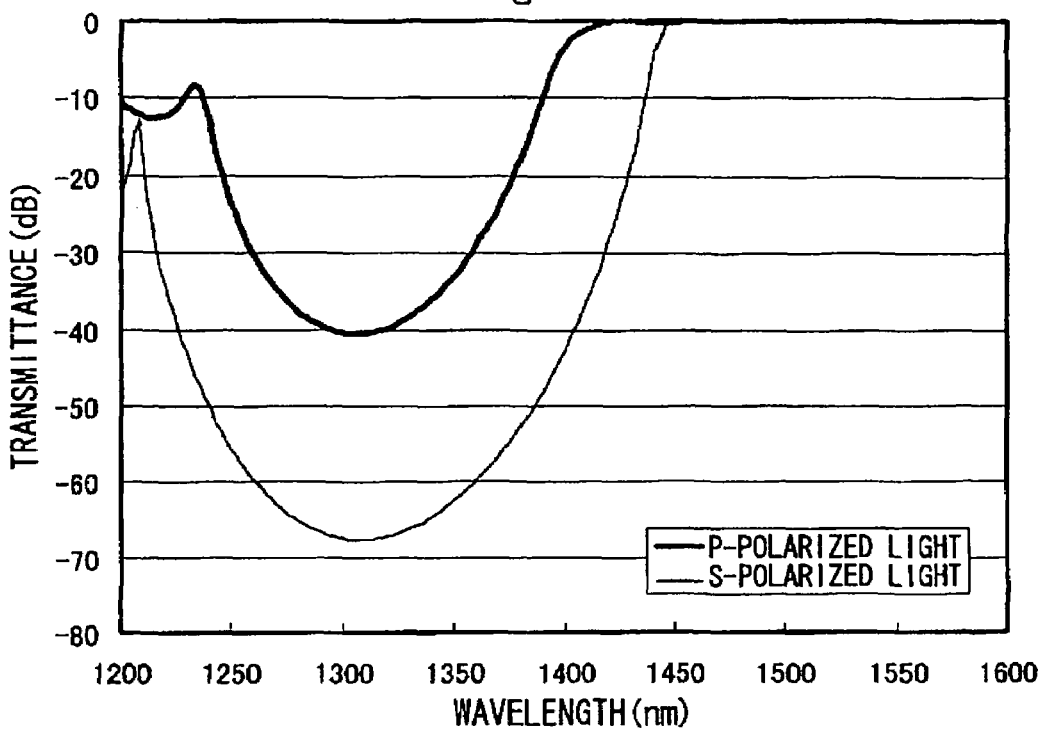
FIG. 11 is a graph showing the characteristics of an optical edge filter, which is a first filter A of the third example.

FIG. 11 shows the characteristics of a long wave pass filter used as the first filter A 11 in this example. The incident medium is quartz glass with the refractive index of 1.44, the incident angle θ_A is 30 degrees, and the exit medium is quartz glass. The high refractive index material is Ta oxide with the refractive index of 2.15, and the low refractive index material is Si oxide with the refractive index of 1.46.

Figure 12:
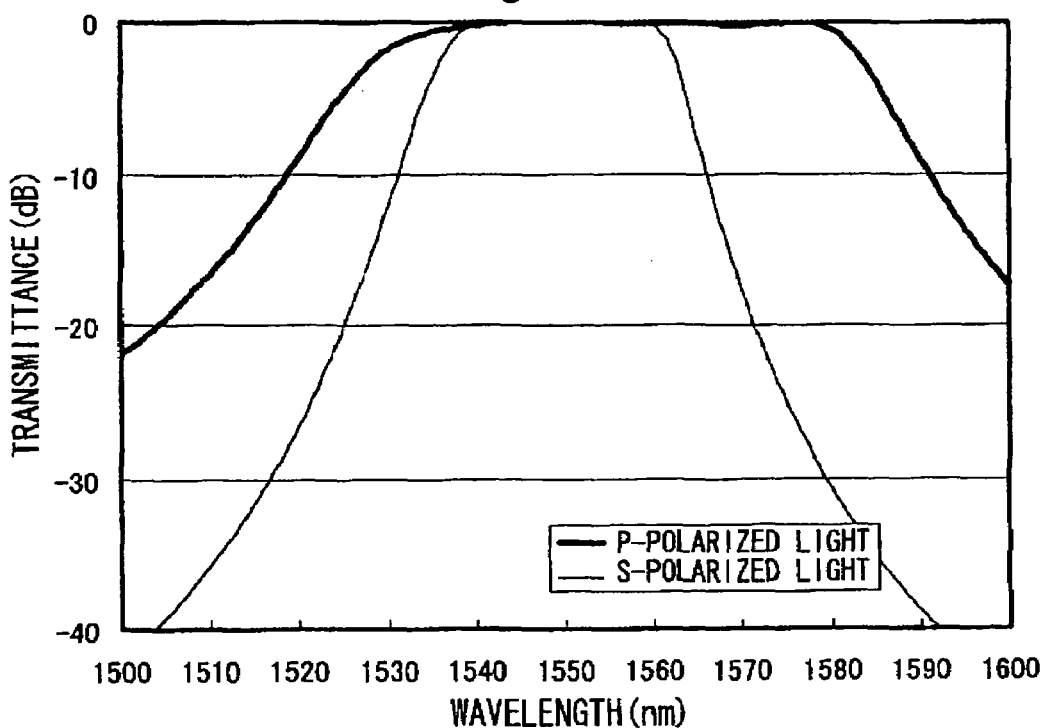
FIG. 12 is a graph showing the characteristics of an optical bandpass filter, which is a second filter B of the third example.

FIG. 12 shows the characteristics of an optical bandpass filter used as the second filter B 21 in this example. The incident medium is quartz glass with the refractive index of 1.44, the incident angle θ_B is 30 degrees, and the exit medium is air. The high refractive index material is Ta oxide with the refractive index of 2.15, and the low refractive index material is Si oxide with the refractive index of 1.46.

Figure 13:
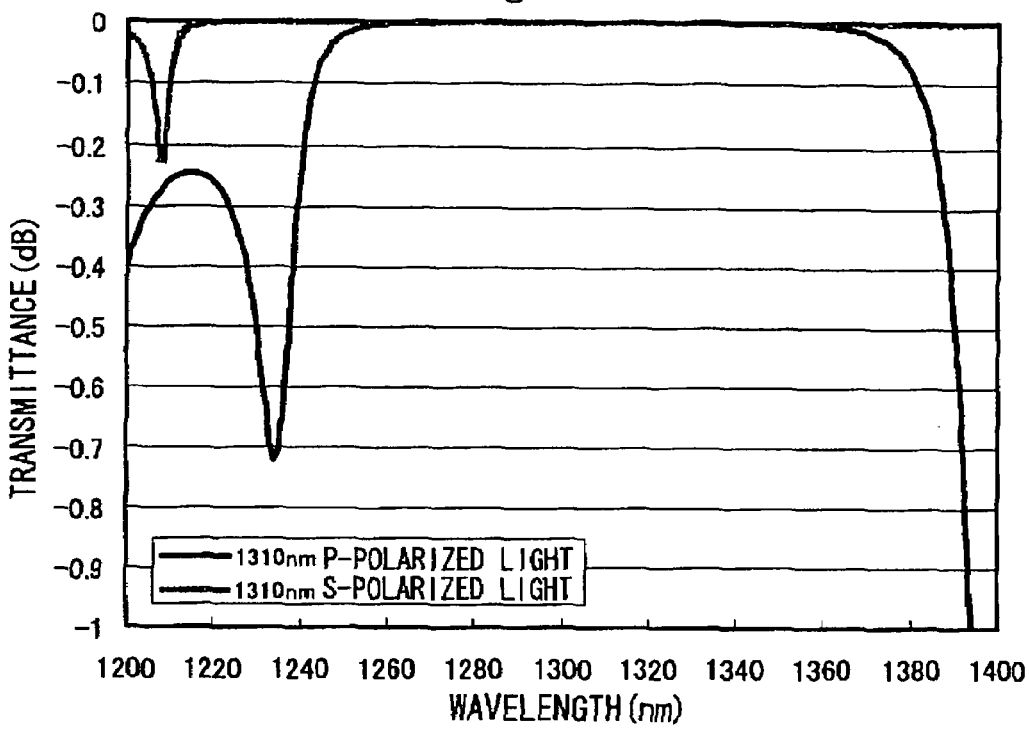
FIG. 13 is a graph showing the characteristics of a transmitting signal of the wavelength division multiplexer of the third example.

FIG. 13 shows the characteristics of a transmitting signal with the center wavelength of 1310 nm in the wavelength division multiplexer of this example. In the use range of 1260 to 1360 nm, transmission loss is low both for the P-polarized and S-polarized light, thus having suitable multiplexing characteristics.

Figure 14:
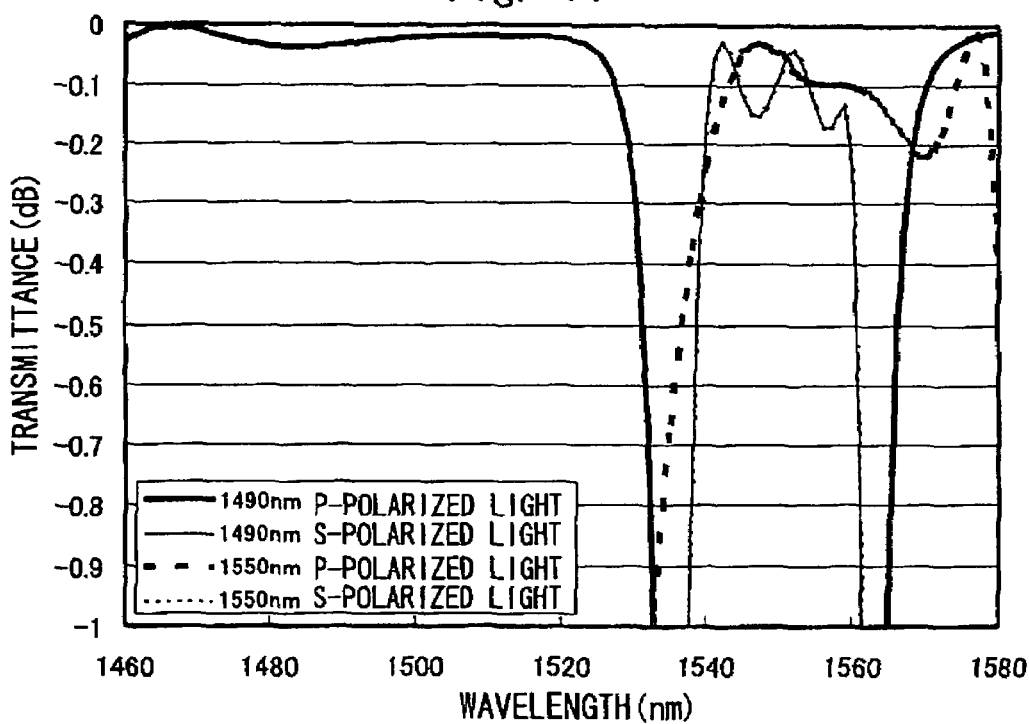
FIG. 14 is a graph showing the characteristics of a receiving signal of the wavelength division multiplexer of the third example.

FIG. 14 shows the characteristics of a receiving signal with the wavelength bands of 1490 nm and 1550 nm in the wavelength division multiplexer of this example. In the use range of 1480 to 1500 nm for the 1490 nm receiving light, and 1540 to 1560 nm for the 1550 nm receiving light, transmission loss is low both for the P-polarized and S-polarized light, thus having suitable dividing characteristics.

EXAMPLE 4

The fourth example shows the case of using the wavelength division multiplexer 1 of the second embodiment shown in FIG. 2.

In the wavelength division multiplexer 1, the first filter A 11 is placed on one surface of the optical substrate C 40, and the second filter B 21 is placed on another surface of the same substrate. The three-wavelength multiplexed light, which is incoming and outgoing light, first enters the first filter A 11, where it is separated into the light of λ3 and two-wavelength multiplexed light consisting of λ1 and λ2. Then, the two-wavelength multiplexed light enters the second filter B 21, where it is separated into the light of λ1 and the light of λ2. A short wave pass filter is used as the first filter A 11, and an optical bandpass filter is used as the second filter B 21.

The three-wavelength multiplexed light enters or exits the substrate C 40 through the light incident and exit surface C 41. In this example, the light incident and exit surface C 41 is placed perpendicular to the three-wavelength multiplexed light.

The three-wavelength multiplexed light enters or exits the first filter A 11 at the angle θ_A with respect to the normal to the filter surface. The light with the center wavelengths 1550 nm and 1490 nm in the three-wavelength multiplexed light is reflected by surface of the first filter A 11 in the substrate side at the angle θ_A, passes through the substrate, and then enters the second filter B 21. Even if the light with the center wavelength of 1310 nm from another light source comes from the same direction as the wavelengths 1550 nm and 1490 nm and gets mixed in with the three-wavelength multiplexed light, it only passes through the first filter A 11, causing no problem.

The light with the center wavelength of 1310 nm used for transmission exits the first filter A 11 at the angle θ_A. The light path of the light passed through the first filter A 11 thereby corresponds to the light path of the light of 1550 nm and 1490 nm, allowing the light of 1310 nm to be coupled into the optical fiber through which the three-wavelength multiplexed light is transmitted.

In this example, the substrate C is formed of quartz glass, the angle θ_A is 30 degrees, and the value of $n_A * \sin θ_A$ is 0.72. It is preferred to use P-polarization of transmission light with the center wavelength of 1310 nm as incident light on the substrate C 40 so as to reduce reflection on the substrate surface and reduce transmission loss.

The transmission light with the center wavelength of 1310 nm is refracted as it passes through the first filter A 11 and enters the substrate C.

On the other hand, the two-wavelength multiplexed light with the center wavelengths of 1550 nm and 1490 nm, which is reflected by the first filter A 11, enters the second filter B 21 at the angle of $\theta_B$ with respect to the normal to the filter surface. The second filter B 21 is designed as an optical bandpass filter which transmits the light of 1550 nm and reflects the light of 1490 nm.

Since the incident medium of the first filter A 11 and the incident medium of the second filter B 21 are the same in this example, the angle α for obtaining the incident angle $\theta_B$ is given by the equation (2). Since the angle $\theta_A$ is 30 degrees in this example, the angle α for obtaining the angle $\theta_B$ of 12 degrees is 42 degrees. The exit surface C 42 is placed parallel with the surface of the second filter B 21 in this example.

Figure 15:
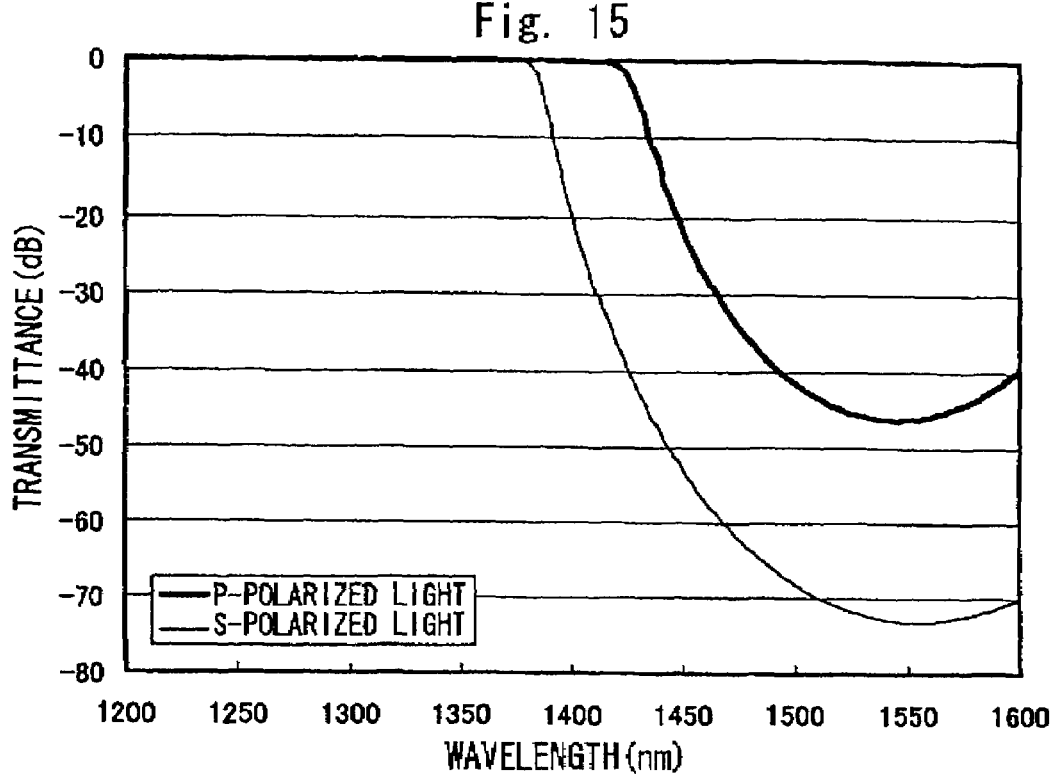
FIG. 15 is a graph showing the characteristics of an optical edge filter, which is a first filter A of a fourth example.

FIG. 15 shows the characteristics of a short wave pass filter used as the first filter A 11 in this example. The incident medium is quartz glass with the refractive index of 1.44, the incident angle $\theta_A$ is 30 degrees, and the exit medium is air. The high refractive index material is Nb oxide with the refractive index of 2.21, and the low refractive index material is Si oxide with the refractive index of 1.46.

Figure 16:
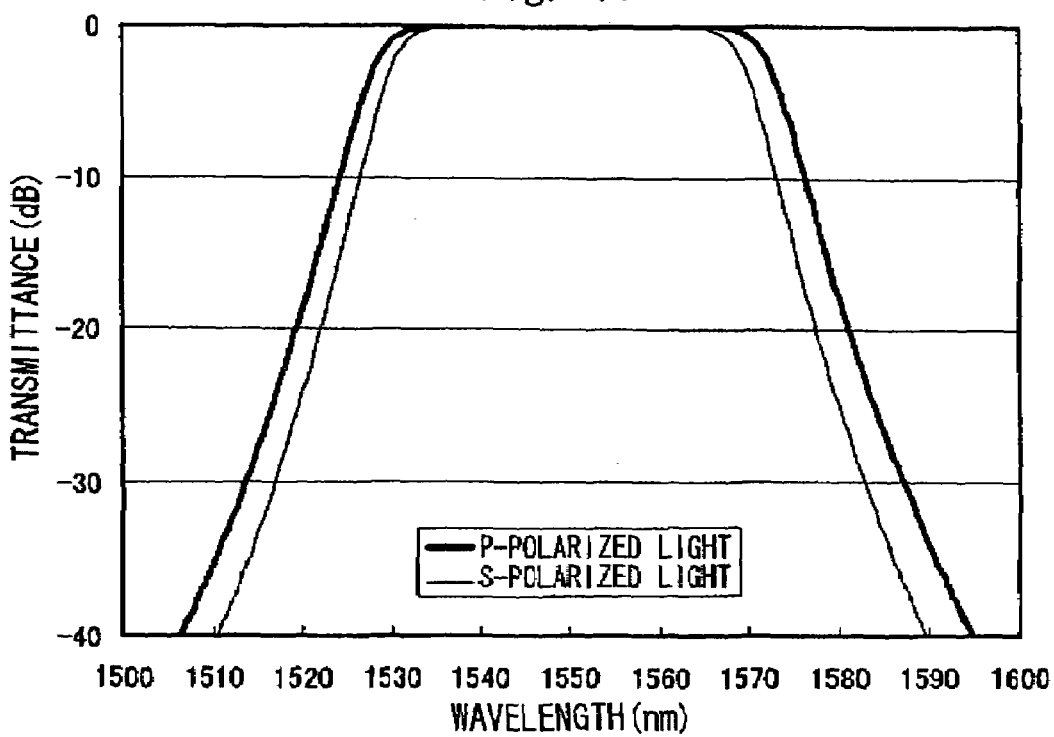
FIG. 16 is a graph showing the characteristics of an optical bandpass filter, which is a second filter B of the fourth example.

FIG. 16 shows the characteristics of an optical bandpass filter used as the second filter B 21 in this example. The incident medium is quartz glass with the refractive index of 1.44, the incident angle $\theta_B$ is 12 degrees, and the exit medium is air. The high refractive index material is Nb oxide with the refractive index of 2.21 and the low refractive index material is Si oxide with the refractive index of 1.46.

Figure 17:
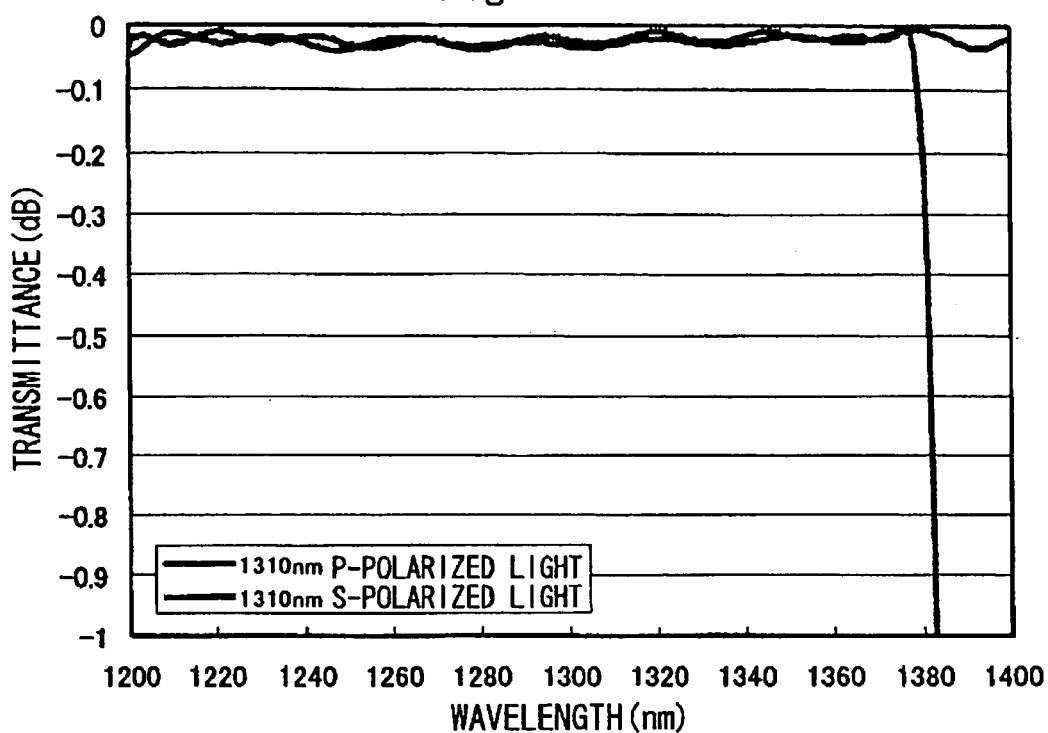
FIG. 17 is a graph showing the characteristics of a transmitting signal of the wavelength division multiplexer of the fourth example.

FIG. 17 shows the characteristics of a transmitting signal with the center wavelength of 1310 nm in the wavelength division multiplexer of this example. In the use range of 1260 to 1360 nm, transmission loss is low both for the P-polarized and S-polarized light, thus having suitable multiplexing characteristics.

Figure 18:
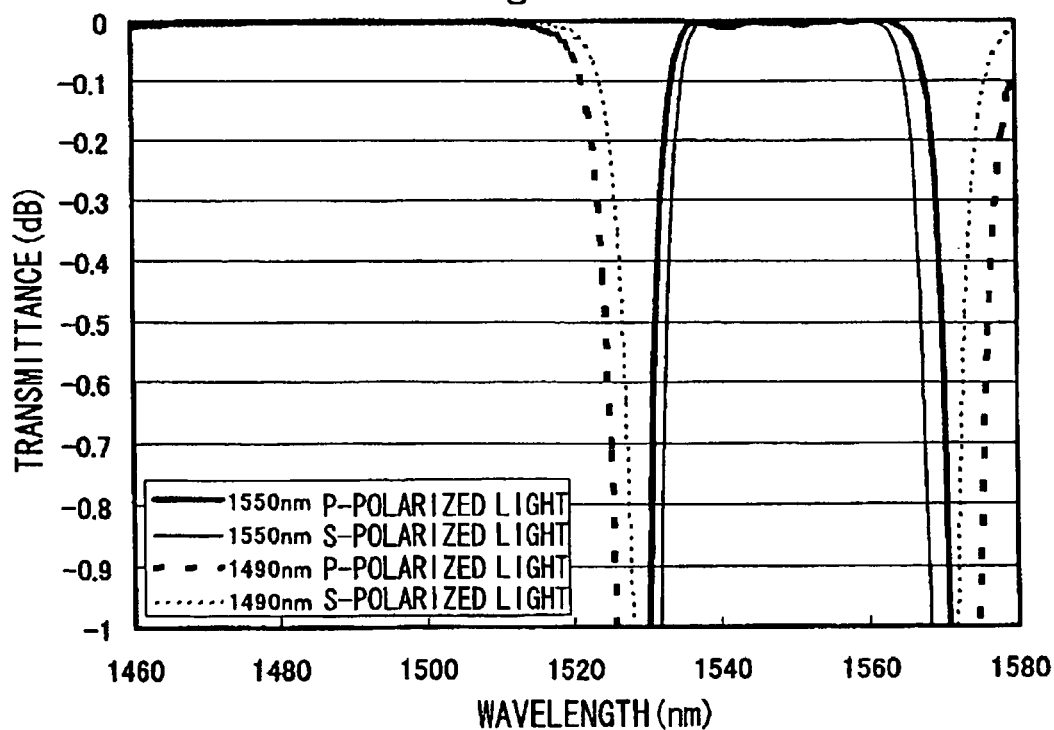
FIG. 18 is a graph showing the characteristics of a receiving signal of the wavelength division multiplexer of the fourth example.

FIG. 18 shows the characteristics of a receiving signal with the wavelength band of 1490 nm and 1550 nm in the wavelength division multiplexer of this example. In the use range of 1480 to 1500 nm for the 1490 nm receiving light, and 1540 to 1560 nm for the 1550 nm receiving light, transmission loss is low both for the P-polarized and S-polarized light, thus having suitable dividing characteristics.

EXAMPLE 5

Figure 19:
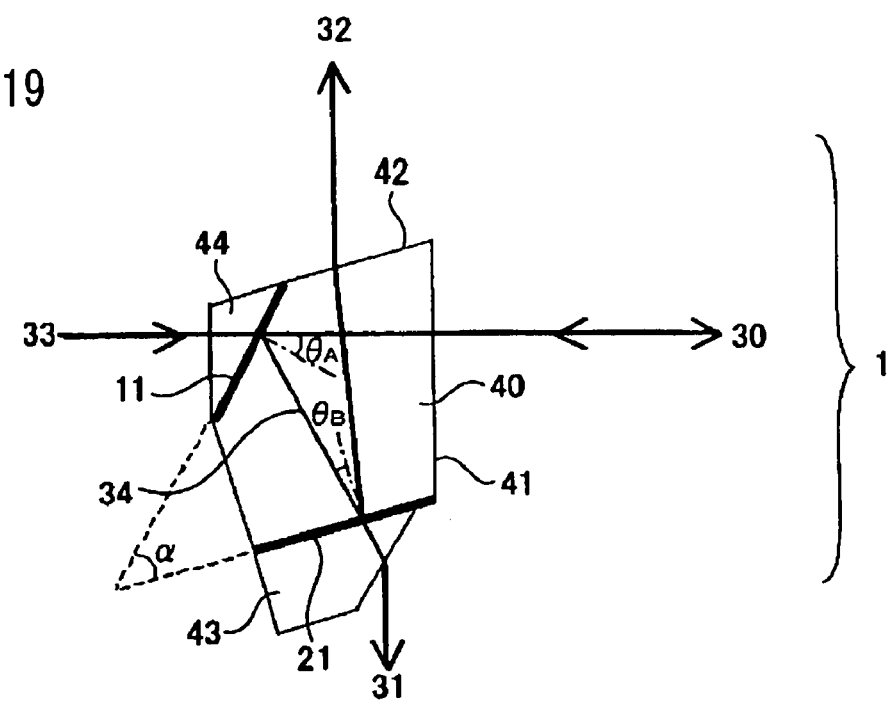
FIG. 19 is diagram showing a wavelength division multiplexer of a fifth example.

FIG. 19 is a schematic diagram illustrating anther example of the wavelength division multiplexer according to the present invention. Its basic structure is the same as the one described in the fourth example. In this example, a λ3 angle correction substrate 44 is placed on the outer side surface of the first filter A 11, and a λ2 angle correction substrate 43 is placed on the outer side surface of the second filter B 21.

The λ3 angle correction substrate 44 is used to set a certain angle between the light of λ3 and the three-wavelength multiplexed light. The λ3 angle correction substrate 44 may be eliminated if this angle can be the same as that in the fourth example. Though the λ3 angle correction substrate 44 is made of the material having the same refractive index as the substrate C 40 in this example, it may be different.

Further, in order to fix the λ3 angle correction substrate 44 to the substrate C 40, the first filter A 11 and an optically transparent bonding material are placed between them. Preferably, they are arranged in the order of: the substrate C 40, the first filter A 11, the bonding material, and the λ3 angle correction substrate 44. This allows reducing about 1 to 5% transmission loss of the λ1 and λ2 light due to the bonding material. Alternatively, they may be arranged in the order of: the substrate C 40, the bonding material, the first filter A 11, the bonding material, and the λ3 angle correction substrate 44.

Further, if the light of λ3 reflected from the first filter A 11 at the reflectance of about 0 to 10% in the direction 32 gets mixed in a light receiving element placed in the direction 32, crosstalk may occur. The crosstalk can be avoided by roughing the surface of the λ3 angle correction substrate 44 in the exit surface C 42 side so as to scatter the light reflected by the first filter A 11.

In this example, the λ3 angle correction substrate 44 is formed of quartz glass, which is the same as the substrate C 40, and the angle is set perpendicular to the three-wavelength multiplexed light.

Similarly, the λ2 angle correction substrate 43 is used to set a certain angle between the light of λ2 and the three-wavelength multiplexed light. The λ2 angle correction substrate 43 may be eliminated if this angle can be the same as that in the fourth example. Though the λ2 angle correction substrate 43 is made of the material having the same refractive index as the substrate C 40 in this example, it may be different.

Further, in order to fix the λ2 angle correction substrate 43 to the substrate C 40, the second filter B 21 and an optically transparent bonding material are placed between them. Preferably, they are arranged in the order of: the substrate C 40, the second filter B 21, the bonding material, and the λ2 angle correction substrate 43. This allows reducing about 1 to 5% transmission loss of the λ2 light due to the bonding material. Alternatively, they may be arranged in the order of: the substrate C 40, the bonding material, the second filter B 21, the bonding material, and the λ2 angle correction substrate 43.

In this example, the λ2 angle correction substrate 43 is formed of quartz glass, which is the same as the substrate C 40, and the angle is set to 36 degrees so that the light of λ2 exits at a right angle to the three-wavelength multiplexed light. Since the substrate C is formed of quartz glass with the refractive index of 1.44, the angle $\theta_A$ is 30 degrees, $\theta_B$ is 12 degrees, the value of $n_A*\sin\theta_A$ is 0.72, $n_B*\sin\theta_B$ is 0.30, and the angle α is 42 degrees.

In this example, it is possible to use a filter designed to work well when the exit media of the edge filter having the characteristics shown in FIG. 15 and the bandpass filter in FIG. 16 used in the fourth example are both quartz glass. Hence, the same optical characteristics as in the fourth example can be obtained.

EXAMPLE 6

Figure 20:
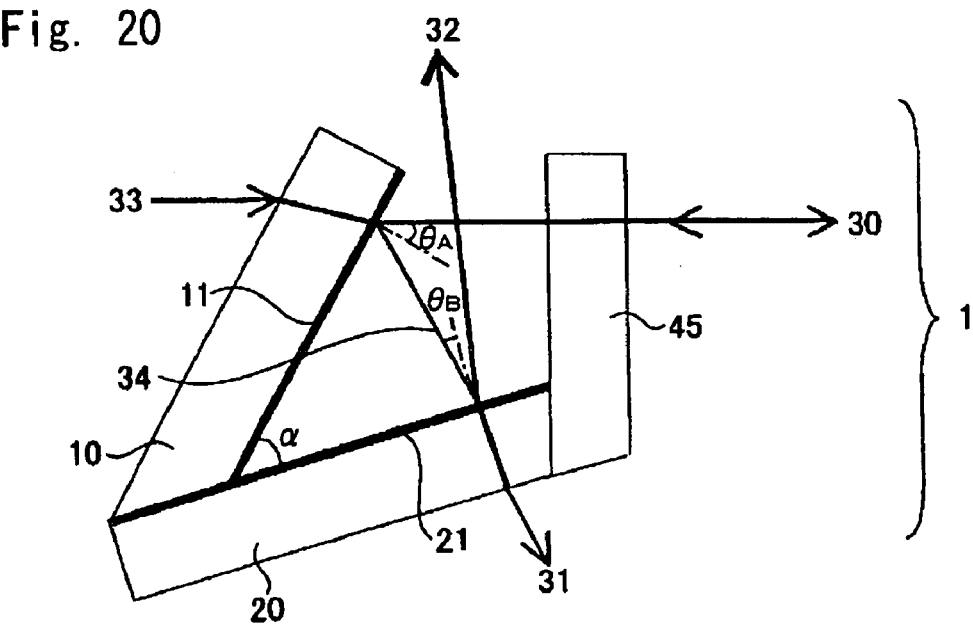
FIG. 20 is diagram showing a wavelength division multiplexer of a sixth example.

FIG. 20 is a schematic diagram illustrating another example of the wavelength division multiplexer according to the present invention. Its basic structure is the same as described in the fourth example. In this example, the optical substrates A 10 and B 20 are integrated together, thereby achieving miniaturization.

In this example, since the substrate A 10 is quartz glass, the incident angle on the first filter A 11 is 30 degrees, and the incident medium is air, the value of $n_A*\sin\theta_A$ is 0.5. Since the substrate B 20 is quartz glass, the incident angle on the second filter B 21 is 12 degrees, and the incident medium is air, the value of $n_B*\sin\Theta_B$ is 0.21. The angle α between the first filter A 11 and the second filter B 21 is 42 degrees.

Figure 21:
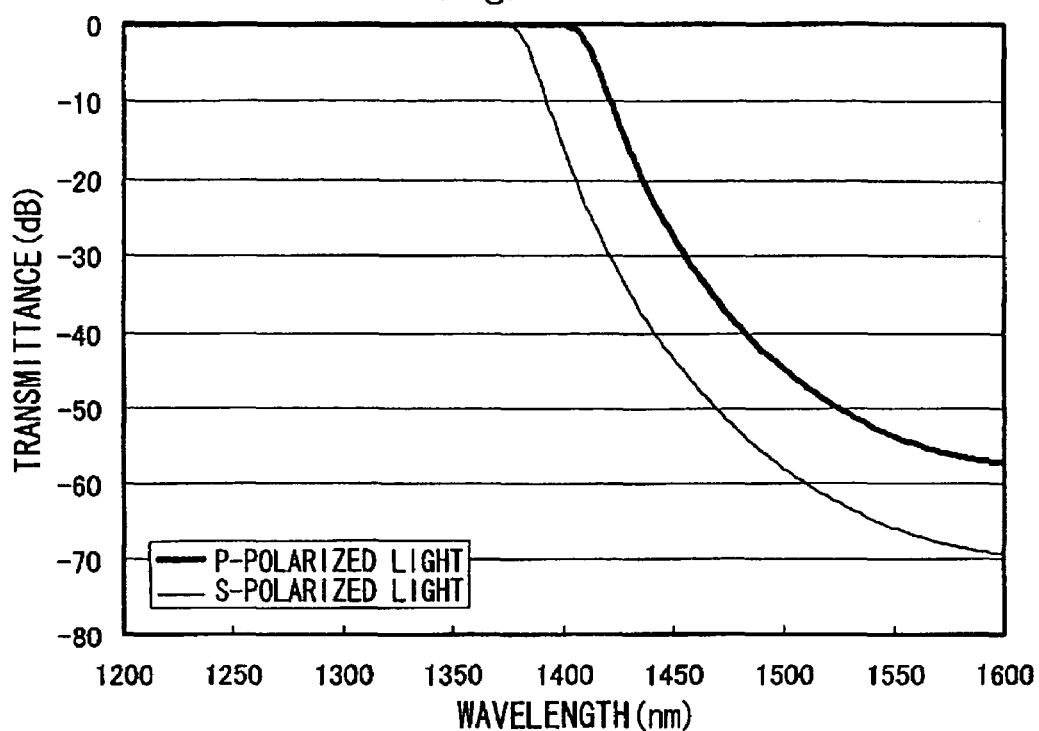
FIG. 21 is a graph showing the characteristics of an optical edge filter, which is a first filter A of the sixth example.

FIG. 21 shows the characteristics of a short wave pass filter used as the first filter A 11 in this example. The incident medium is air, the incident angle $\theta_A$ is 30 degrees, and the exit medium is quartz glass with the refractive index of 1.44. The high refractive index material is Nb oxide with the refractive index of 2.21, and the low refractive index material is Si oxide with the refractive index of 1.46.

Figure 22:
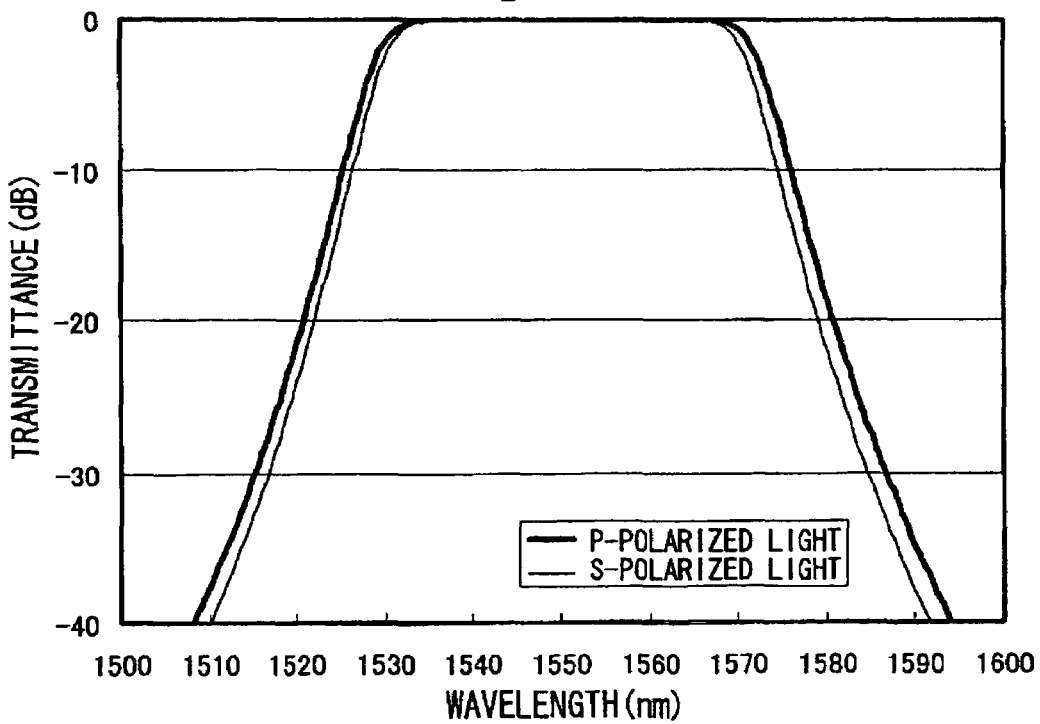
FIG. 22 is a graph showing the characteristics of an optical bandpass filter, which is a second filter B of the sixth example.

FIG. 22 shows the characteristics of an optical bandpass filter used as the second filter B 21 in this example. The incident medium is air, the incident angle $\theta_B$ is 12 degrees, and the exit medium is quartz glass with the refractive index of 1.44. The high refractive index material is Nb oxide with the refractive index of 2.21 and the low refractive index material is Si oxide with the refractive index of 1.46.

Figure 23:
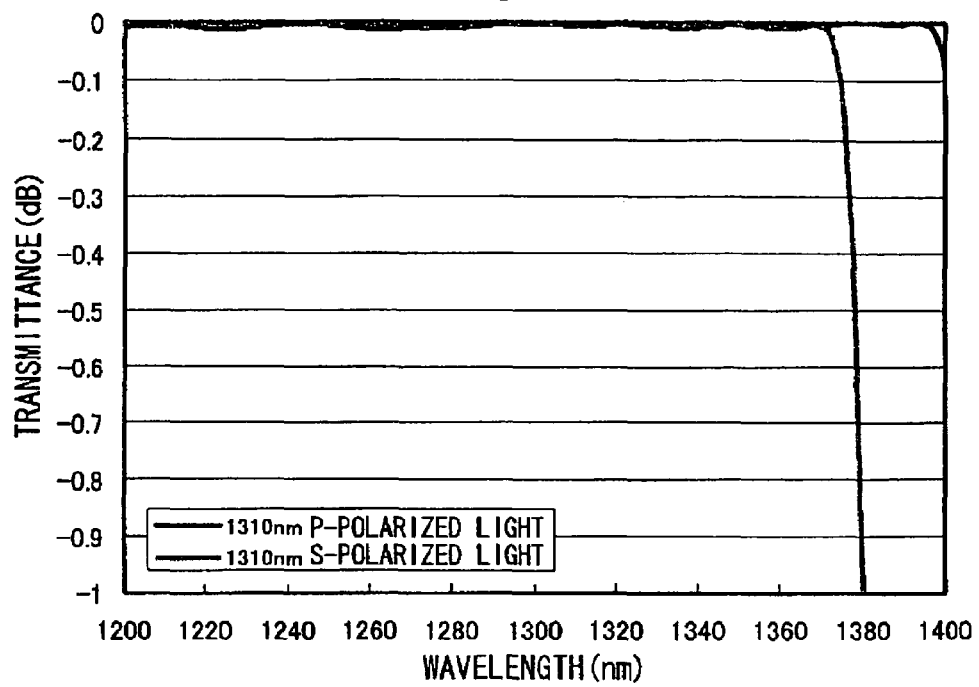
FIG. 23 is a graph showing the characteristics of a transmitting signal of the wavelength division multiplexer of the sixth example.

FIG. 23 shows the characteristics of a transmitting signal with the center wavelength of 1310 nm in the wavelength division multiplexer of this example. In the use range of 1260 to 1360 nm, transmission loss is low both for the P-polarized and S-polarized light, thus having suitable multiplexing characteristics.

Figure 24:
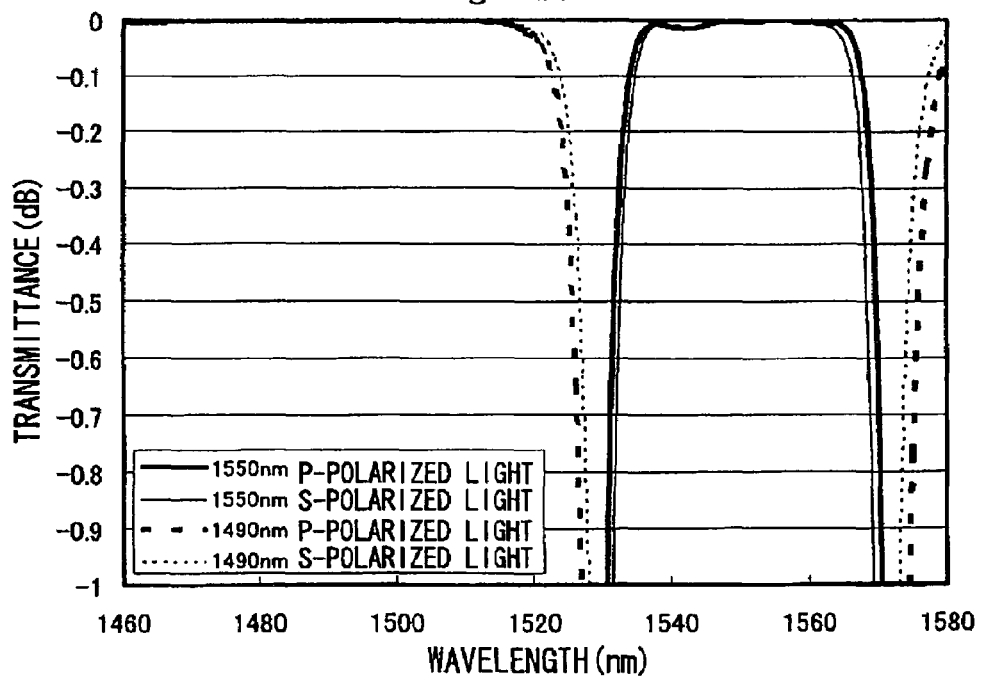
FIG. 24 is a graph showing the characteristics of a receiving signal of the wavelength division multiplexer of the sixth example.

FIG. 24 shows the characteristics of a receiving signal with the wavelength band of 1490 nm and 1550 nm in the wavelength division multiplexer of this example. In the use range of 1480 to 1500 nm for the 1490 nm receiving light, and 1540 to 1560 nm for the 1550 nm receiving light, transmission loss is low both for the P-polarized and S-polarized light, thus having suitable dividing characteristics.

EXAMPLE 7

Figure 25:
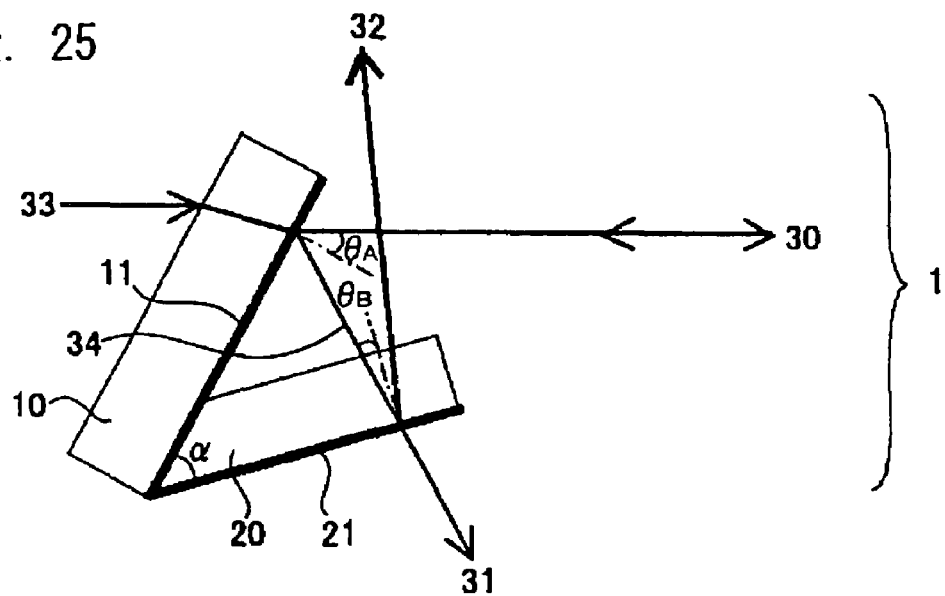
FIG. 25 is diagram showing a wavelength division multiplexer of a seventh example.

FIG. 25 is a schematic diagram illustrating another example of the wavelength division multiplexer according to the present invention. Its basic structure is the same as described in the fourth example. In this example, the optical substrates A 10 and B 20 are integrated together, achieving miniaturization.

In this example, the substrate A is quartz glass, the incident angle on the first filter A 11 is 30 degrees, and the incident medium is air. Thus, the value of $n_A*\sin\theta_A$ is 0.5. The substrate B is quartz glass, the incident angle on the second filter B 21 is 8 degrees, and the incident medium is quartz glass. Hence, the value of $n_B*\sin\theta_B$ is 0.20 and the angle $\alpha$ between the first filter A 11 and the second filter B 21 is 42 degrees.

The filter used in this example may be the same as the one used in the sixth example. Thus, the same optical characteristics as in the sixth example can be obtained.

EXAMPLE 8

The eighth example uses the wavelength division multiplexer 1 described in the third embodiment.

Figure 26:
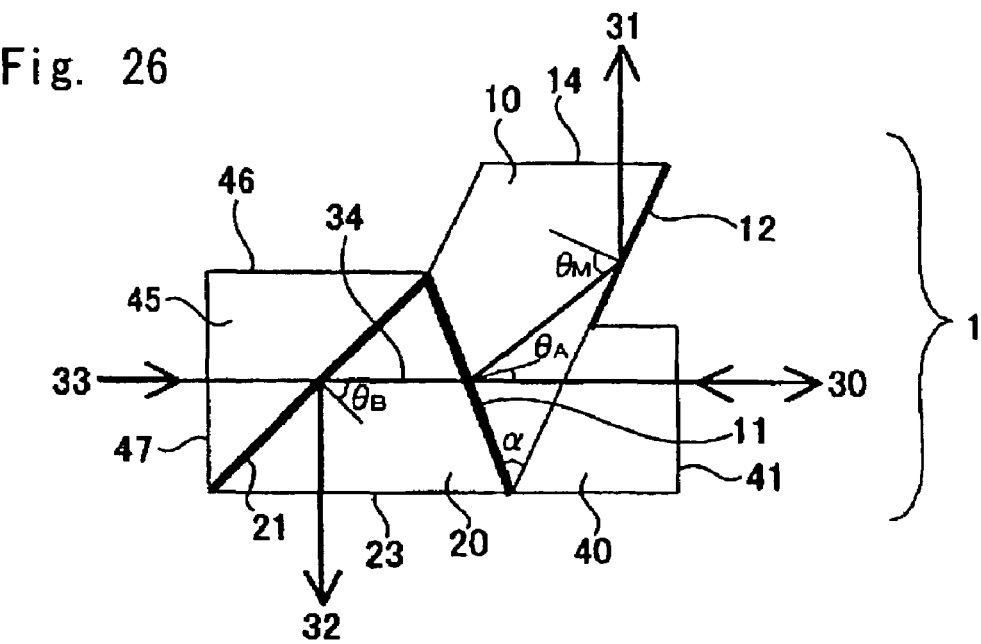
FIG. 26 is diagram showing a wavelength division multiplexer of an eighth example.

FIG. 26 is a schematic diagram illustrating another example of the wavelength division multiplexer according to the present invention. The wavelength division multiplexer 1 is composed of four optical substrates, A 10, B 20, C 40, and D 45, which are bonded together by optically transparent bonding material and so on.

The first filter A 11 is placed between the substrates A 10 and B 20, and the second filter B 21 is placed between the substrates B 20 and D 45. Further, a mirror 12 is placed on the inner surface of the substrate A 10 in the same plane as the bonded surface of the substrates A 10 and C 40.

The incoming light of $\lambda 1$ comes from the direction 30 and is reflected by the first filter A 11. The light of $\lambda 1$ is thereby separated and reflected by the mirror 12 to exit in the direction 31. The incoming light of $\lambda 2$ also comes from the direction 30 and passes through the first filter A 11, and is reflected by the second filter B 32. The light of $\lambda 2$ is thereby separated and reflected to exit in the direction 32. The outgoing light of $\lambda 3$, on the other hand, comes from the direction 33 and passes through the second filter B 21 and the first filter A 11 to the direction 30.

Short wave pass filters having different characteristics are used as the first filter A 11 and the second filter B 21. The first filter A 11 and the second filter B 21 are formed on the substrate by the vacuum deposition method. Thus, as shown in FIG. 26, the two optical filters having different characteristics are placed on the substrate composed of four optical substrates bonded together, which allows smaller size of the wavelength division multiplexer. Further, since the position in which the light of each wavelength enters of exits the substrate is apart from the substrate bonded surface, it is possible to reduce the adverse effect of the bonding material while achieving miniaturization.

The light incident and exit surface C 41 through which the three-wavelength multiplexed light enters or exits the substrate C 40 may be at a right angle or within 1 to 10 degrees from the right angle with respect to the three-wavelength multiplexed light 30. The three-wavelength multiplexed light, which is transmitted or received light in the wavelength division multiplexer 1 enters or exits through the light incident and exit surface C 41.

One way is to let the incoming and outgoing light to enter or exit the multiplexer 1 is to transform the three-wavelength multiplexed light transmitted through an optical fiber and so on into parallel light with a collimator lens and the like and then guide it to the first filter A 11. Another way is to fix a ferrule of an optical fiber to the light incident and exit surface C 41 by bonding or melt bonding and then guide diffused light having a divergence angle determined by NA of the optical fiber to the first filter A 11.

Though the substrate C 40 is bonded to the substrate A 10 for easier incidence of the three-wavelength multiplexed light, the substrate C 40 may be eliminated in the case of transforming the three-wavelength multiplexed light into parallel light with a collimator lens and so on. Further, it is possible to apply an AR coating to the mirror 12 of the substrate A 10 in order to reduce the loss due to reflection on the surface of the substrate A 10.

The three-wavelength multiplexed light enters or exits the first filter A 11 at the angle $\theta_A$ through the incident medium of the substrate A 10 with the refractive index $n_A$. The light with the center wavelength of 1550 nm is reflected by the first filter A 11. The light with the center wavelengths of 1310 nm and 1490 nm passes through the first filter A 11. Thus, the first filter A 11 is designed as a short wave pass filter.

The angle $\theta_A$ is set to 20 degrees in this example. The optical substrate is quartz glass having a low refractive index. This is because, when using an optical edge filter at grazing-incidence, large refractive index of the incident medium causes large divergence between S-polarized light and P-polarized light, which causes large deviation in the transition wavelength of the edge filter due to variation in the angle $\theta_A$.

The light of $\lambda 1$ reflected from the first filter A 11 is then incident on the mirror 12. The mirror 12 may be a metal film or dielectric multilayer film having high reflectance, or a total reflection mirror in which the value of the incident angle $\theta_M$ satisfies $n_M*\sin\theta_M \geq 1$. The value of the incident angle $\theta_M$ is given by the following equation (3) with the angle $\alpha$ between the first filter A 11 and the mirror 12 and the angle $\theta_A$:

$$\theta_M = \theta_A + \alpha \quad (3)$$

On the other hand, for compact placement of the light receiving element for the light 31 of λ1, it is preferred to set the light 30 of λ1 and the light 31 at a right angle by placing the exit surface A 14 parallel with the light 30 and setting the angle α to 95 degrees.

In this example, the angle α is 45 degrees, $\theta_M$ is 65 degrees, and the incident media of the first filter A 11 and the mirror 12 are both quartz glass. Thus, $n_A=n_M=1.44$, and $n_M*\sin\theta_M=1.31$. The mirror 12 is a total reflection mirror. This eliminates the need for depositing a high-reflectance film, reducing manufacturing costs.

The use of the total reflection mirror can cause the substrate A 10 to be burned over the ages, deteriorating the optical characteristics of the mirror 12. To avoid this, the mirror 12 may be coated with a protection film such as a dielectric thin film like Si oxide and a metal thin film like Au.

Particularly, if a dielectric thin film such as Si oxide having a similar refractive index to the substrate A 10 is formed, even when the protection film covers the bonded surface of the substrates A 10 and C 40, the reflection of the three-wavelength multiplexed light on the protection film surface can be reduced, which prevents reduction of transmittance. It is thereby possible to deposit the protection film all over the surface of the mirror 12 on the substrate A 10, which eliminates the need for masking the deposition area and reduces manufacturing costs.

The two-wavelength multiplexed light 34 consisting of λ2 and λ3, which has passed through the first filter A 11, enters the second filter B 21 at the angle $\theta_B$ through the incident medium of the substrate B 20 with the refractive index $n_B$. The light of 1490 nm is reflected by the second filter B 21 to be separated, while the light of 1310 nm passes through the second filter B 21. Thus, the second filter B 21 is designed as a short wave pass filter.

Since the wavelength bands of λ2 (1490 nm) and λ3 (1310 nm) are apart from each other in this example, increase in the angle $\theta_B$ causes no significant adverse effect on the optical characteristics. Thus, the angle $\theta_B$ is 45 degrees and the optical substrate is quartz glass, which is the same as the substrate A 10. Further, if incident light is P-polarization of the light of λ3, it is possible to use a filter with low-transmittance of S-polarized light as long as it has high transmittance of P-polarized light, for the wavelength band of λ3. This allows use of a filter with less lamination and wide transition band, which reduces the manufacturing costs of the second filter B 21.

Though all the substrates in this example are formed of quartz glass in order that the light of λ3 passing through all the substrates goes straight, it is also possible to use substrates with different refractive index together. In this case, the light of λ3 and the three-wavelength multiplexed light 30 are set parallel by adjusting the inclination angle of the incident surface D 47 to make a certain refraction angle.

The light of λ3 comes from the direction 33 and is reflected at several percents by the second filter B 21. This reflected light can be then reflected at several percents by the cut surface D 46 and reach the second filter B 21 again. This light of λ3 can pass through the second filter B 21 and undesirably get mixed with the light 32 of λ2, causing crosstalk. The problem of crosstalk can be avoided by roughing the cut surface D 46 so as to scatter the light or applying an AR coating to the surface so as to reduce reflection.

In some cases, it is required to provide high isolation for the light of λ1 with the wavelength band of 1550 nm so as to maintain separation from the incoming and outgoing light with the other wavelength bands. In such a case, a bandpass filter for transmitting the light of λ1 may be placed on the exit surface A 14. Similarly, if it is necessary to provide high isolation for the light of λ2 with 1490 nm, a bandpass filter may be placed on the exit surface B 23.

Figure 27:
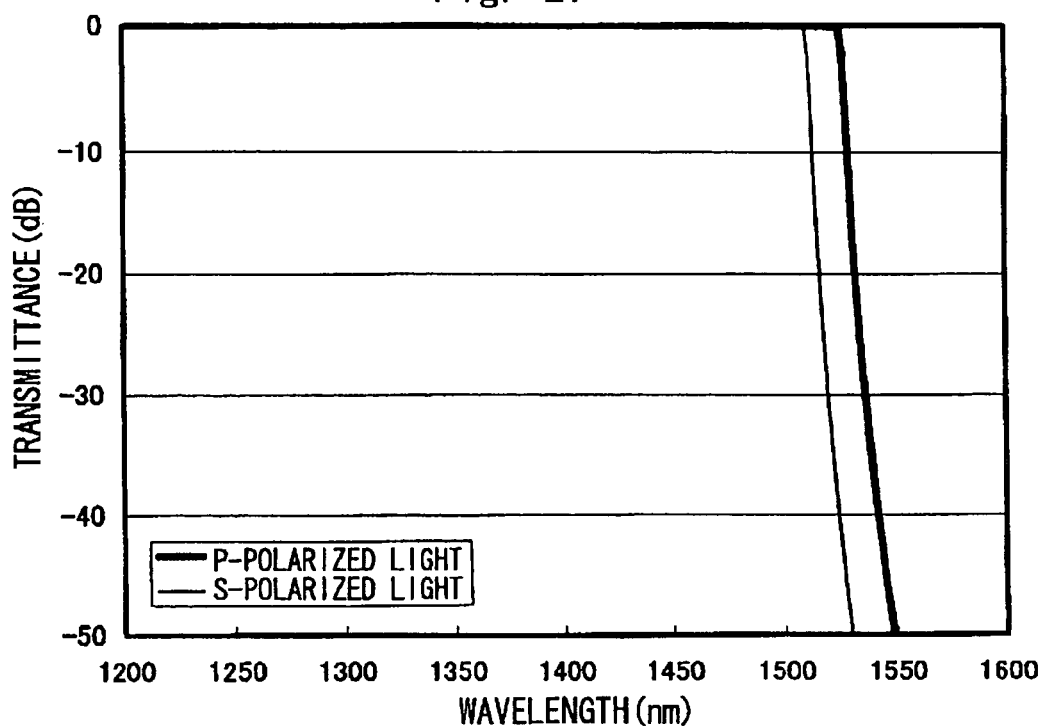
FIG. 27 is a graph showing the characteristics of an optical edge filter, which is a first filter A of the eighth example.

FIG. 27 shows the characteristics of a short wave pass filter used as the first filter A 11 in this example. The incident and exit medium is quartz glass with the refractive index of 1.44, and the incident angle $\theta_A$ is 20 degrees. The low refractive index material is Si oxide with the refractive index of 1.46, and the high refractive index material is Nb oxide with the refractive index of 2.21.

Figure 28:
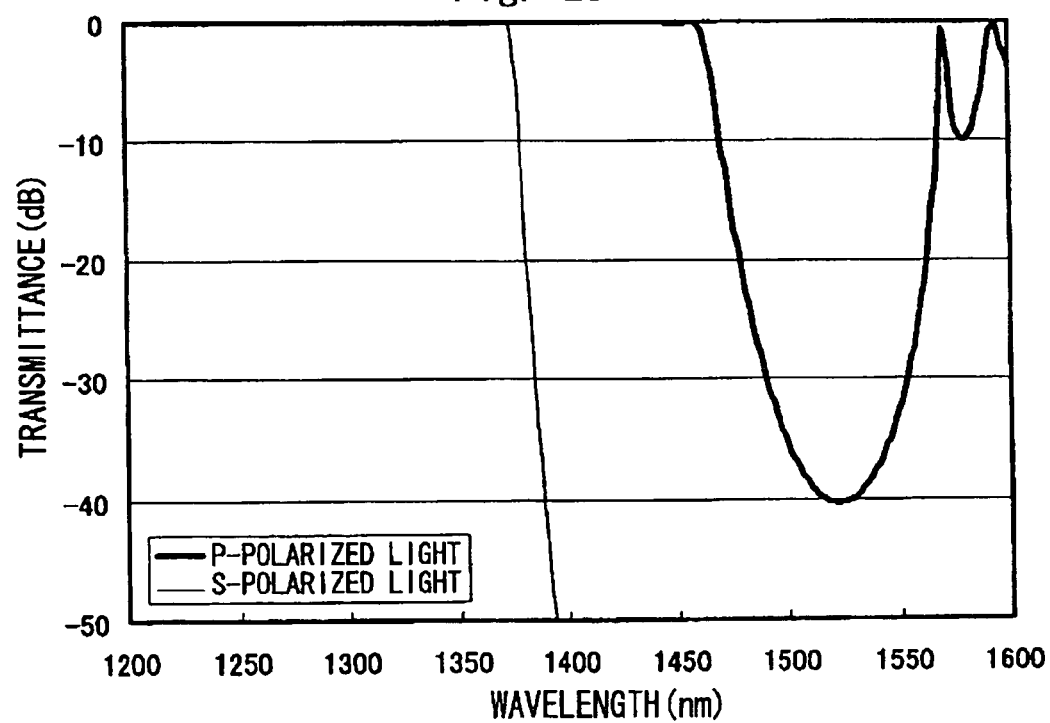
FIG. 28 is a graph showing the characteristics of an optical bandpass filter, which is a second filter B of the eighth example.

FIG. 28 shows the characteristics of a short wave pass filter used as the second filter B 21 in this example. The incident and exit medium is quartz glass with the refractive index of 1.44, the incident angle $\theta_B$ is 45 degrees. The low refractive index material is Si oxide with the refractive index of 1.46, and the high refractive index material is Nb oxide with the refractive index of 2.21.

Figure 29:
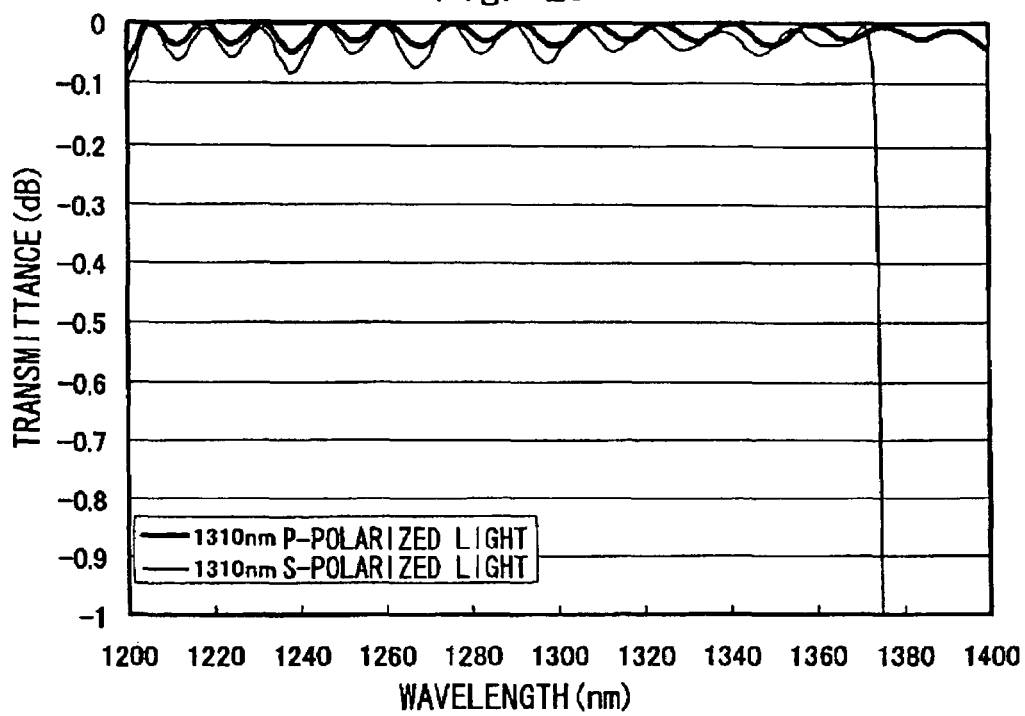
FIG. 29 is a graph showing the characteristics of a transmitting signal of the wavelength division multiplexer of the eighth example.

FIG. 29 shows the characteristics of a transmitting signal with the wavelength band of 1310 nm in the wavelength division multiplexer of this example. In the use range of 1260 to 1360 nm, transmission loss is low both for the P-polarized and S-polarized light, showing suitable multiplexing characteristics.

Figure 30:
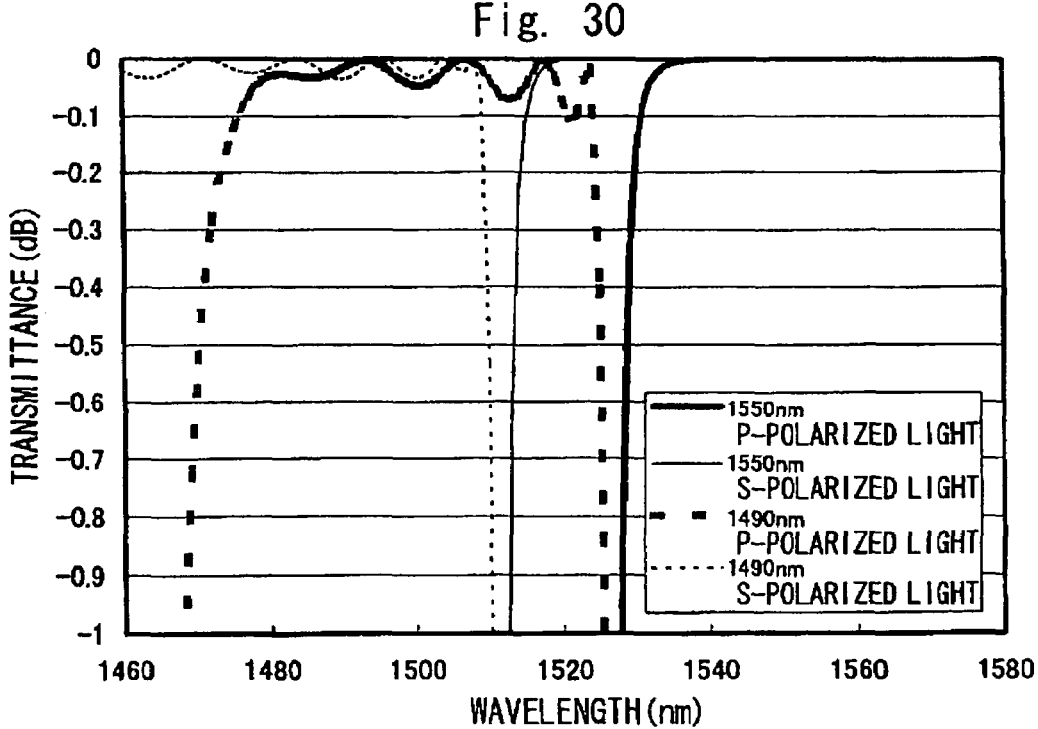
FIG. 30 is a graph showing the characteristics of a receiving signal of the wavelength division multiplexer of the eighth example.

FIG. 30 shows the characteristics of a receiving signal with the wavelength bands of 1490 nm and 1550 nm in the wavelength division multiplexer of this example. In the use range of 1480 to 1500 nm for the 1490 nm receiving light, and 1540 to 1560 nm for the 1550 nm receiving light, transmission loss is low both for the P-polarized and S-polarized light, showing suitable dividing characteristics.

A wavelength available in this invention is not limited to those described in the above examples. It is possible to combine or separate any wavelength multiplexed light consisting of wavelength bands having the same center wavelength ratio as described above with an edge filter. Further, if combined with a filter having other characteristics, the small-size wavelength division multiplexer is capable of combining or separating wavelength multiplexed light consisting of more than three wavelengths.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A wavelength division multiplexer for combining and/or separating wavelength multiplexed light comprising at least three wavelength bands, comprising:
    a single optical substrate or a plurality of optical substrates integrated together; and
    at least two optical filters, a first optical filter and a second optical filter, having different characteristics, placed on the optical substrate or substrates, wherein
    center wavelengths of three wavelength bands, λ1, λ2, and λ3, satisfy: $0.92 \leq \lambda2/\lambda1 \leq 1.08$, and $0.20 \leq \lambda3/\lambda1 \leq 0.92$ or $1.08 \leq \lambda3/\lambda1 \leq 5.00$,
    the first optical filter is placed in a light path of three-wavelength multiplexed light comprising three wavelength bands with the center wavelengths of λ1, λ2, and λ3 to combine or separate light comprising a wavelength band with the center wavelength of λ3 and two-wavelength multiplexed light comprising two wavelength bands with the center wavelengths of λ1 and λ2, and reflects the light of λ3 and transmits the two-wavelength multiplexed light of λ1 and λ2, of the three-wavelength multiplexed light, the second optical filter is placed in a light path of the two-wavelength multiplexed light to combine or separate light comprising a wavelength band with the center wavelength of λ1 and light comprising a wavelength band with the center wavelength of λ2, and reflects the light of λ2 and transmits the light of λ1, of the two-wavelength multiplexed light, and a refractive index $n_A$ of incident medium of the first optical filter, and an angle $\theta_A$ between the three-wavelength multiplexed light incident on the first optical filter and a normal to a surface of the first optical filter satisfy: $\theta_A \geq 15°$ and $n_A * \sin \theta_A \leq 0.95$, and a refractive index $n_B$ of incident medium of the second optical filter, an angle $\theta_B$ between the two-wavelength multiplexed light incident on the second optical filter and a normal to a surface of the second optical filter satisfy: $\theta_B \geq 15°$ and $n_B * \sin \theta_B \leq 0.85$.

2. A wavelength division multiplexer according to claim 1, wherein an angle α between the first optical filter and the second optical filter satisfies: $60° \leq \alpha \leq 120°$.

3. A wavelength division multiplexer according to claim 1, wherein the first optical filter is an edge filter, and the second optical filter is a bandpass filter or an edge filter.

4. A wavelength division multiplexer for combining and/or separating wavelength multiplexed light comprising at least three wavelength bands, comprising:

a single optical substrate or a plurality of optical substrates integrated together; and at least two optical filters, a first optical filter and a second optical filter, having different characteristics, placed on the optical substrate or substrates, wherein center wavelengths of three wavelength bands, λ1, λ2, and λ3, satisfy: $0.92 \leq \lambda2/\lambda1 \leq 1.08$, and $0.20 \leq \lambda3/\lambda1 \leq 0.92$ or $1.08 \leq \lambda3/\lambda1 \leq 5.00$, the first optical filter is placed in a light path of three-wavelength multiplexed light comprising three wavelength bands with the center wavelengths of λ1, λ2, and λ3 to combine or separate light comprising a wavelength band with the center wavelength of λ3 and two-wavelength multiplexed light comprising two wavelength bands with the center wavelengths of λ1 and λ2, and transmits the light of λ3 and reflects the two-wavelength multiplexed light of λ1 and λ2, of the three-wavelength multiplexed light, the second optical filter is placed in a light path of the two-wavelength multiplexed light to combine or separate light comprising a wavelength band with the center wavelength of λ1 and light comprising a wavelength band with the center wavelength of λ2 and transmits the light of λ2 and reflects the light of λ1, of the two-wavelength multiplexed light, and a refractive index $n_A$ of incident medium of the first optical filter, and an angle $\theta_A$ between the three-wavelength multiplexed light incident on the first optical filter and a normal to a surface of the first optical filter satisfy: $\theta_A \geq 5°$ and $n_A * \sin \theta_A \leq 0.95$, and a refractive index $n_B$ of incident medium of the second optical filter, an angle $\theta_B$ between the two-wavelength multiplexed light incident on the second optical filter and a normal to a surface of the second optical filter satisfy: $\theta_B \geq 5°$ and $n_B * \sin \theta_B \leq 0.85$.

5. A wavelength division multiplexer according to claim 4, wherein an angle α between the first optical filter and the second optical filter satisfies: $\alpha \geq \theta_A + 5$ and $10° \leq \alpha \leq 90°$.

6. A wavelength division multiplexer for combining and/or separating wavelength multiplexed light comprising at least three wavelength bands, comprising:

a single optical substrate or a plurality of optical substrates integrated together; and at least two optical filters, a first optical filter and a second optical filter, having different characteristics, placed on the optical substrate or substrates, wherein center wavelengths of three wavelength bands, λ1, λ2, and λ3, satisfy: $0.94 \leq \lambda2/\lambda1 \leq 0.98$, and $0.20 \leq \lambda3/\lambda1 \leq 0.94$, the first optical filter is placed in a light path of three-wavelength multiplexed light comprising three wavelength bands with the center wavelengths of λ1, λ2, and λ3 to combine or separate light comprising a wavelength band with the center wavelength of λ1 and two-wavelength multiplexed light comprising two wavelength bands with the center wavelengths of λ2 and λ3, and the second optical filter is placed in a light path of the two-wavelength multiplexed light to combine or separate light comprising a wavelength band with the center wavelength of λ2 and light comprising a wavelength band with the center wavelength of λ3, wherein incident light of λ3 on the wavelength division multiplexer is P-polarized light.

7. A wavelength division multiplexer according to claim 6, wherein the first optical filter reflects the light of λ1 and transmits the two-wavelength multiplexed light of λ2 and λ3, of the three-wavelength multiplexed light, the second optical filter reflects the light of λ2 and transmits the light of λ3, of the two-wavelength multiplexed light, and an angle $\theta_A$ between the three-wavelength multiplexed light incident on the first optical filter and a normal to a surface of the first optical filter satisfies: $5° \leq \theta_A \leq 30°$.

8. A wavelength division multiplexer for combining and/or separating wavelength multiplexed light comprising at least three wavelength bands, comprising:

a single optical substrate or a plurality of optical substrates integrated together;

at least two optical filters, a first optical filter and a second optical filter, having different characteristics, placed on the optical substrate or substrates; and a mirror placed in a light path of the light of λ1 reflected from the first optical filter, wherein center wavelengths of three wavelength bands, λ1, λ2, and λ3, satisfy: $0.94 \leq \lambda2/\lambda1 \leq 0.98$, and $0.20 \leq \lambda3/\lambda1 \leq 0.94$, the first optical filter is placed in a light path of three-wavelength multiplexed light comprising three wavelength bands with the center wavelengths of λ1, λ2, and λ3 to combine or separate light comprising a wavelength band with the center wavelength of λ1 and two-wavelength multiplexed light comprising two wavelength bands with the center wavelengths of λ2 and λ3 and reflects the light of λ1 and transmits the light of λ2 and λ3, of the three-wavelength multiplexed light, the second optical filter is placed in a light path of the two-wavelength multiplexed light to combine or separate light comprising a wavelength band with the center wavelength of λ2 and light comprising a wavelength band with the center wavelength of λ3 and reflects the light of λ2 and transmits the light of λ3, of the two-wavelength multiplexed light, an angle $\theta_A$ between the three-wavelength multiplexed light incident on the first optical filter and a normal to a surface of the first optical filter satisfies: $5° \leq \theta_A \leq 30°$, and a refractive index $n_M$ of incident medium of the mirror, and an angle $\theta_M$ between the light of λ1 reflected from the first optical filter and a normal to a surface of the mirror satisfy: $n_M * \sin \theta_M \geq 1$ and $\theta_B \leq 85°$.

* * * * *